United States Patent
AlYousif et al.

(10) Patent No.: US 11,578,572 B2
(45) Date of Patent: Feb. 14, 2023

(54) METHODS OF CONTROLLING WATER PRODUCTION FROM HYDROCARBON BEARING SUBTERRANEAN FORMATIONS USING DENSE CARBON DIOXIDE COMPOSITIONS

(71) Applicant: Saudi Arabian Oil Company, Dhahran (SA)

(72) Inventors: Zuhair AlYousif, Saihat (SA); Muhammad Majid Almajid, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 118 days.

(21) Appl. No.: 17/097,553

(22) Filed: Nov. 13, 2020

(65) Prior Publication Data
US 2022/0154563 A1 May 19, 2022

(51) Int. Cl.
*C09K 8/594* (2006.01)
*E21B 43/12* (2006.01)
(Continued)

(52) U.S. Cl.
CPC ............ *E21B 43/164* (2013.01); *C09K 8/588* (2013.01); *C09K 8/594* (2013.01); *E21B 33/12* (2013.01);
(Continued)

(58) Field of Classification Search
CPC ........ E21B 43/164; E21B 43/12; E21B 49/00; C09K 8/588; C09K 8/594
See application file for complete search history.

(56) References Cited

U.S. PATENT DOCUMENTS

| 4,495,995 A | * | 1/1985 | Chen ...................... C09K 8/518 166/309 |
| 4,569,393 A | | 2/1986 | Bruning et al. |

(Continued)

FOREIGN PATENT DOCUMENTS

| CN | 104774604 A | 7/2015 |
| CN | 108264604 A | 7/2018 |

(Continued)

OTHER PUBLICATIONS

Alyousef et al., "Direct Thickening of Supercritical Carbon Dioxide Using CO2-Soluble Polymer", Society of Petroleum Engineers, SPE-197185-MS, 2019.
(Continued)

*Primary Examiner* — Catherine Loikith
(74) *Attorney, Agent, or Firm* — Dinsmore & Shohl LLP

(57) ABSTRACT

A method for reducing water production from a hydrocarbon bearing subterranean formation includes identifying a high permeability zone in the formation and injecting a dense $CO_2$ composition from a production well into the high permeability zone. The dense $CO_2$ composition includes dense $CO_2$ and a thickener soluble in the dense $CO_2$. The thickener includes a copolymer that is the polymerized reaction product of monomers that include at least one alkenyl ether or dialkenyl ether monomer, at least one acrylate or methacrylate monomer, at least one structural monomer, and at least one allyl ester monomer. After injecting the dense $CO_2$ composition into the high permeability zone, the method includes withdrawing hydrocarbons from the hydrocarbon bearing subterranean formation through the production well. The dense $CO_2$ composition blocks pores in the high permeability zone to reduce or prevent flow of water from the high permeability zone into the production well.

20 Claims, 8 Drawing Sheets

(51) Int. Cl.
*E21B 43/16* (2006.01)
*C09K 8/588* (2006.01)
*E21B 33/12* (2006.01)
*E21B 33/138* (2006.01)
*E21B 43/24* (2006.01)
*E21B 49/00* (2006.01)

(52) U.S. Cl.
CPC ............ *E21B 33/138* (2013.01); *E21B 43/12* (2013.01); *E21B 43/24* (2013.01); *E21B 49/00* (2013.01)

(56) References Cited

U.S. PATENT DOCUMENTS

| | | | | |
|---|---|---|---|---|
| 4,657,944 | A | * | 4/1987 | Bruning ................. E21B 43/164 524/424 |
| 4,673,038 | A | * | 6/1987 | Sandiford ............... C09K 8/594 166/295 |
| 4,800,957 | A | | 1/1989 | Stevens, Jr. et al. |
| 5,117,907 | A | | 6/1992 | Hsu |
| 7,151,078 | B2 | | 12/2006 | Zaroslov et al. |
| 2014/0008064 | A1 | * | 1/2014 | Stehle ...................... C09K 8/58 166/275 |
| 2017/0114269 | A1 | | 4/2017 | Hancu et al. |
| 2019/0316029 | A1 | | 10/2019 | Enick |
| 2022/0154562 | A1 | * | 5/2022 | AlYousif ............... E21B 43/164 |

FOREIGN PATENT DOCUMENTS

| | | |
|---|---|---|
| EP | 212671 A2 | 3/1987 |
| WO | 2009131967 A1 | 10/2009 |
| WO | 2017190920 A1 | 11/2017 |
| WO | 2020146884 A1 | 7/2020 |

OTHER PUBLICATIONS

Enick et al., "Direct Thickeners for Carbon Dioxide", Society of Petroleum Engineers, SPE 59325, Apr. 3-5, 2000.
Heller et al., "Direct Thickeners for Mobility Control of CO2 Floods", Society of Petroleum Engineers, pp. 679-686, Oct. 1985.
Lee et al., "Development of Small Molecule CO2 Thickeners for EOR and Fracturing", Society of Petrolem Engineers, SPE-169039, Apr. 12-16, 2014.
Carpenter, "Development of Small-Molecule CO2 Thickeners", Summary of Lee article SPE 169039, General Electric Global Research, prepared for 2014 SPE Improved Oil Recovery Symposium, pp. 145-147, 2014.
International Search Report and Written Opinion dated Mar. 1, 2022 pertaining to International application No. PCT/US2021/057871 filed Nov. 3, 2021, 15 pages.
Enick, R. M., "Mobility and Conformance Control for Carbon Dioxide Enhanced Oil Recovery (CO2-EOR) via Thickeners, Foams, and Gels—A Detailed Literature Review of 40 Years of Research", National Energy Technology Laboratory, Dec. 31, 2011, pp. 1-236.
International Search Report and Written Opinion dated Mar. 4, 2022 pertaining to International application No. PCT/JS2021/058018 filed Nov. 4, 2021, 15 pages.

* cited by examiner

METHODS OF CONTROLLING WATER PRODUCTION FROM HYDROCARBON BEARING SUBTERRANEAN FORMATIONS USING DENSE CARBON DIOXIDE COMPOSITIONS

TECHNICAL FIELD

The present disclosure generally relates to production of hydrocarbons from hydrocarbon bearing subterranean formations, and more specifically, methods for controlling water production from hydrocarbon bearing subterranean formation using dense carbon dioxide compositions.

BACKGROUND

In subterranean resource well drilling, primary oil recovery methods contribute to recovery of only about 15% of the crude oil in the reservoir. Secondary recovery methods, such as water flooding, can produce an additional 30% or more of the original oil in place (OOIP) in the reservoir. During a water flooding recovery process, an injection fluid is injected into the subterranean formation from an injection well that is spaced apart from the production well. The injected water displaces hydrocarbons contained in the subterranean formation and drives these hydrocarbons towards the production well to increase the production of these hydrocarbons from the subterranean formation. One of the main problems associated with this recovery mechanism is the channeling of the injection fluid through high permeability zones. Channeling of the injection fluid through high permeability zones can cause regions of the formation and large amounts of hydrocarbons to be bypassed, which results in a poor sweep efficiency.

At the production well, management of large amounts of produced water is a major challenge facing the oil industry that can cause operational difficulties if left unchecked. These operational difficulties include corrosion of pipes, migration of fines to the production well, and acceleration of well abandonment. It is estimated that water comprises about 64% of the total liquid production from oil production wells, which leads to more than $40 billion that is spent annually to process this large water volume. Water production can be caused by high permeability zones in the subterranean formation. In particular, high permeability zones in the formation can convey connate water from water zones in the formation or can provide a pathway for breakthrough of aqueous injection fluids from water flooding enhanced oil recovery processes at the production well.

SUMMARY

In the oil and gas industry, there is an ongoing need for compositions and methods for treating high permeability zones in subterranean formations. In particular, there is an ongoing need for compositions and methods for enhancing oil recovery from hydrocarbon bearing subterranean formations by treating high permeability zones from an injection well to improve water flooding sweep efficiency and increase hydrocarbon production. Additionally, there is an ongoing need for compositions and methods for reducing water production from hydrocarbon bearing subterranean formations by blocking high permeability zones from the production well.

Dense carbon dioxide ($CO_2$) can be used in place of aqueous treatment fluids as a main blocking agent for treating high permeability zones to modify the injection profile during a water flooding process or to reduce or prevent water production from high permeability zones at the production well. Dense carbon dioxide refers to carbon dioxide having increased density as a result of being at a temperature and pressure that causes the carbon dioxide to be in the liquid or supercritical phase. However, dense carbon dioxide alone may not have sufficient viscosity to effectively block high permeability zones or to resist displacement from flow of other formation fluids or treatment fluids, which may result in breakthrough of the carbon dioxide at the production well.

The present disclosure relates to methods of treating high permeability zones by injecting dense carbon dioxide compositions that include dense carbon dioxide and a thickener. The thickener is an environmentally friendly $CO_2$ thickener that is readily soluble in dense $CO_2$ and capable of increasing the viscosity of the dense $CO_2$ by several orders of magnitude at the typical injection conditions of the subterranean formations. Once injected, the dense $CO_2$ compositions with the increased viscosity blocks the pores, fractures, or both of the high permeability zones to reduce or prevent passage of other fluids, such as aqueous treatment fluids or water, through the high permeability zone. The present disclosure relates to methods for enhanced oil recovery to improve recovery of hydrocarbons, such as crude oil, from hydrocarbon bearing subterranean formations that include injecting the dense $CO_2$ compositions into the high permeability zone from an injection well and then conducting a water flooding process while collecting hydrocarbons from the production well. The present disclosure also relates to methods for reducing water production at the production well by injecting the dense $CO_2$ compositions into high permeability zones from the production well. The methods of the present disclosure may enhance the recovery of hydrocarbons, reduce production of produced water from the subterranean formation, or both while at the same time providing a beneficial subterranean use for $CO_2$ to help reduce $CO_2$ in the atmosphere. The use of dense $CO_2$ instead of water may also help reduce water usage and, hence, improve natural water resource preservation.

According to one or more aspects of the present disclosure, a method for reducing water production from a hydrocarbon bearing subterranean formation may include identifying a high permeability zone in the hydrocarbon bearing subterranean formation and injecting a dense carbon dioxide composition from a production well into the high permeability zone. The dense carbon dioxide composition comprises dense carbon dioxide and a thickener soluble in the dense carbon dioxide, where the thickener may comprise a copolymer. The copolymer may be the polymerized reaction product of monomers that include at least one alkenyl ether or dialkenyl ether monomer, at least one acrylate or methacrylate monomer, at least one structural monomer, and at least one allyl ester monomer. The method may further include, after injecting the dense carbon dioxide composition into the high permeability zone, withdrawing hydrocarbons from the hydrocarbon bearing subterranean formation through the production well. The dense carbon dioxide composition may block pores in the high permeability zone to reduce or prevent flow of water from the high permeability zone into the production well.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE FIGURES

The following detailed description of specific embodiments of the present disclosure can be best understood when read in conjunction with the following drawings, where like structure is indicated with like reference numerals and in which.

DETAILED DESCRIPTION

Figure 1:
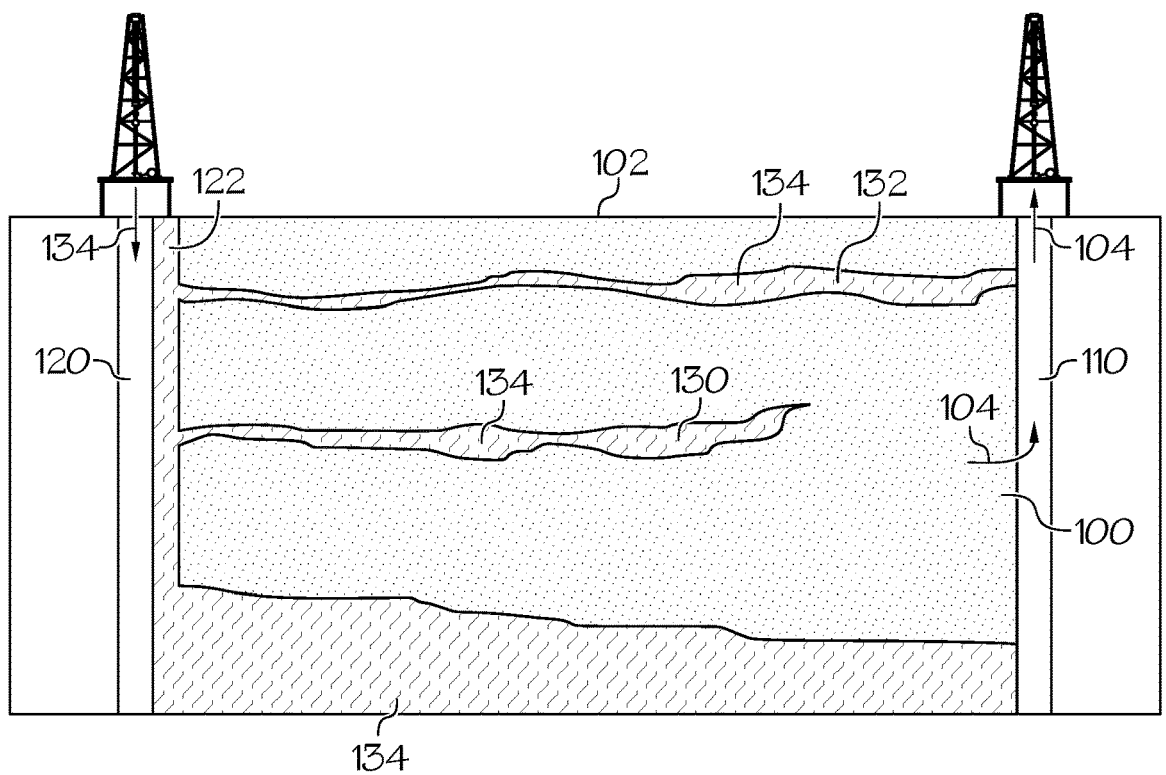
FIG. 1 schematically depicts enhanced oil recovery of hydrocarbons from a hydrocarbon bearing subterranean formation comprising one or more high permeability zones, according to one or more embodiments shown and described in the present disclosure.

Embodiments of the present disclosure relate to methods for the use and application of the dense carbon dioxide compositions for enhanced oil recovery (EOR) from hydrocarbon-bearing subterranean formations and for reducing water production from hydrocarbon-bearing subterranean formations. Referring to FIGS. 1-4, one embodiment of a method for enhanced oil recovery from a hydrocarbon bearing subterranean formation 100 is schematically depicted. The method for enhanced oil recovery may include withdrawing hydrocarbons from a production well 110 extending into the hydrocarbon bearing subterranean formation 110, identifying one or more high permeability zones 130, 132 in the hydrocarbon bearing subterranean formation 100, and injecting a dense carbon dioxide composition 142 (dense $CO_2$ composition) from an injection well 120 into the high permeability zones 130, 132 of the hydrocarbon bearing subterranean formation 100. The dense $CO_2$ composition 142 may include dense $CO_2$ and a thickener soluble in the dense $CO_2$. The thickener may comprise a copolymer that is a polymerized reaction product of monomers that include at least one alkenyl ether or dialkenyl ether monomer, at least one acrylate or methacrylate monomer, at least one structural monomer, and at least one allyl ester monomer. The method may further include, after injecting the dense $CO_2$ composition 142 into the high permeability zones 130, 132, injecting an aqueous treatment fluid 138 from the injection well 120 into the hydrocarbon bearing subterranean formation 100. The dense $CO_2$ composition 142 injected into the formation may block the high permeability zones 130, 132 and may divert at least a portion of the aqueous treatment fluid 138 into bypassed regions of the hydrocarbon bearing subterranean formation 100 during the injecting of the aqueous treatment fluid 138 into the hydrocarbon-bearing subterranean formation 100. Injecting of the aqueous treatment fluid 138 into the hydrocarbon bearing subterranean formation may drive hydrocarbons 104 in the hydrocarbon bearing subterranean formation 100 towards the production well 110. The methods for enhanced oil recovery according to the present disclosure may improve sweep efficiency of water flooding processes to enhance recovery of hydrocarbons 104 from the hydrocarbon bearing subterranean formation 100.

Referring now to FIGS. 5-8, one embodiment of a method for reducing water production from a hydrocarbon bearing subterranean formation 100 according to the present disclosure is schematically depicted. The method for reducing water production may include identifying one or more high permeability zones 150, 152 in the hydrocarbon bearing subterranean formation 100 and injecting the dense $CO_2$ composition 142 from the production well 110 into each of the high permeability zones 150, 152. The dense $CO_2$ composition 142 may include dense $CO_2$ and a thickener soluble in the dense $CO_2$. The thickener may comprise a copolymer that is a polymerization reaction product of monomers that include at least one alkenyl ether or dialkenyl ether monomer, at least one acrylate or methacrylate monomer, at least one structural monomer, and at least one allyl ester monomer. The method may further include, after injecting the dense $CO_2$ composition 142 into the high permeability zones 150, 152, withdrawing hydrocarbons 104 from the hydrocarbon bearing subterranean formation 100 through the production well 110. The dense $CO_2$ composition 142 may block pores, fractures, or both in the high permeability zones 150, 152 to reduce or prevent flow of water and other aqueous fluids from the high permeability zones 150, 152 into the production well 110. The method may reduce water production from the hydrocarbon bearing subterranean formation, which can improve the economic efficiency of the hydrocarbon production process.

As previously discussed, the methods of the present disclosure may improve the sweep efficiency of water flooding techniques for enhanced oil recovery to increase production of hydrocarbons or may reduce water production from the hydrocarbon bearing subterranean formation. Additionally, the methods of the present disclosure may provide a beneficial subterranean use of $CO_2$. It is a well-known fact that $CO_2$ is a major contributor to the greenhouse effect and global warming, and $CO_2$ injection into subterranean formations can help in reducing the amount of $CO_2$ in the atmosphere and, thus, can assist in mitigating high levels of global warming. Similar to water-less fracking operations, the use of dense $CO_2$ instead of water may also help reduce the use of water in hydrocarbon production processes and, hence, improve water natural resource preservation, among other features of the disclosed methods.

As used throughout the present disclosure, the term "crude oil" refers to liquid hydrocarbons extracted from a hydrocarbon bearing subterranean formation. The term crude oil may include oil extracted from hydrocarbon bearing subterranean formations and subjected desalting processes. However, crude oil is not intended to include effluents resulting from separation of the crude oil into various hydrocarbon fractions or effluents produced by processes for upgrading the crude oil through one or more chemical reactions, such as cracking, hydrocracking, hydrotreating, reforming, or other upgrading reaction.

As used throughout the present disclosure, the term "hydrocarbon-bearing subterranean formation" refers to a below-ground geologic region containing hydrocarbons, such as crude oil, hydrocarbon gases, or both, which may be extracted from the geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery.

As used throughout the present disclosure, the term "original oil in place" or "OOIP" may refer to the total volume of hydrocarbons contained in a subterranean reservoir or rock sample (such as a core sample) prior to production of hydrocarbons from the subterranean formation or rock sample.

As used in the present disclosure, the term "uphole" refers to a direction in a wellbore that is towards the surface. For example, a first component that is uphole relative to a second component is positioned closer to the surface of the wellbore relative to the second component.

As used in the present disclosure, the term "downhole" refers to a direction further into the formation and away from the surface. For example, a first component that is downhole relative to a second component is positioned farther away from the surface of the wellbore relative to the second component.

As used in the present disclosure, the term "high permeability zone" refers to a region of a subterranean formation having a permeability to fluids that is at least 2 times the permeability of the surrounding portions of the subterranean formation. High permeability zones can include regions of the subterranean formation having greater porosity, larger pore sizes, or both and fractures in the formation providing a flow path through the formation.

As used throughout the present disclosure, the term "dense carbon dioxide" may refer to carbon dioxide that is not in the gaseous phase, such as carbon dioxide in a state having a density of greater than or equal to 10,000 mol per cubic meter and may include liquid carbon dioxide or supercritical carbon dioxide, which is at a temperature and pressure above the critical point for carbon dioxide. The abbreviation $CO_2$ may be used to denote carbon dioxide throughout the present disclosure.

As used throughout the present disclosure, the term "supercritical fluid" may refer to any substance that is at a temperature and pressure that are above the critical point for that substance, but the pressure is less than the pressure required to compress the substance into a solid. The "critical point" of a substance is the temperature and pressure above which distinct liquid and gas phases do not exist for the substance.

Referring now to FIG. 1, enhanced oil recovery from a hydrocarbon bearing subterranean formation 100 by water flooding is schematically depicted. A production well 110 may extend from the surface 102 downhole into the hydrocarbon bearing subterranean formation 100. The production well 110 may be in fluid communication with the hydrocarbon bearing subterranean formation 100 to extract hydrocarbons 104 from the hydrocarbon bearing subterranean formation 100. As discussed previously, primary oil recovery methods, such as extracting hydrocarbons 104 from the hydrocarbon bearing subterranean formation 100 from the production well 110, alone can contribute to recovery of only about 15% of the hydrocarbons in a hydrocarbon bearing subterranean formation (oil reservoir). Secondary oil recovery methods and enhanced oil recovery methods can be used to further increase the recovery of hydrocarbons 104 from the hydrocarbon bearing subterranean formation 100.

Water flooding processes can produce an additional 30 percent of the original oil in place in the hydrocarbon bearing subterranean formation 100. In a water flooding process, an injection well 120 is drilled into the hydrocarbon bearing subterranean formation 100 or into a subterranean formation adjacent to the hydrocarbon bearing subterranean formation 100. The injection well 120 is spaced apart from the production well 110 by a distance of from 10 meters to 1000 meters, or even a distance greater than 1000 meters. Aqueous treatment fluids 134, such as water or water with one or more oilfield additives, may be injected from the injection well 120 into the hydrocarbon bearing subterranean formation 100 or into a subterranean formation adjacent to the hydrocarbon bearing subterranean formation 100. The injected aqueous treatment fluids 134 may flow towards the production well 110 and may displace hydrocarbons 104 in the hydrocarbon bearing subterranean formation 100. The injected aqueous treatment fluids 134 may drive the hydrocarbons 104 towards the production well 110 to increase the recovery of the hydrocarbons 104 from the hydrocarbon bearing subterranean formation 100.

One of the main problems associated with water flooding to increase hydrocarbon recovery is the channeling of the injected aqueous treatment fluids 134 through high permeability zones 130, 132 through portions of the hydrocarbon bearing subterranean formation 100. Channeling of the aqueous treatment fluids 134 through the high permeability zones 130, 132 can cause bypass of regions of the hydrocarbon bearing subterranean formation 100 and bypass of large amounts of hydrocarbons in these regions, which results in a poor sweep efficiency of the water flooding treatment. This can lead to reduced effectiveness of the water flooding process in improving hydrocarbon production and can result in further consumption of water resources to compensate for loss of the aqueous treatment fluids 134 through the high permeability zones 130, 132.

In such cases, the injection profile can be modified to reduce the effects of the high permeability zones 130, 132. Some conventional methods for modifying the injection profile during water flooding have included conventional chemical-based techniques such as the injection of treatment compositions comprising gels, polymers, nanoparticles, or combinations of these. All these chemicals use water as the base fluid. This means that a specific amount of any selected chemical is added to water and then injected into the targeted wells to block the high permeability zones as well as any fractured zones and, hence, improve the injection profile. However, these conventional chemical-based techniques require further consumption of water and result in introducing chemicals, such as gels, polymers, or nanoparticles, into the formation.

Figure 5:
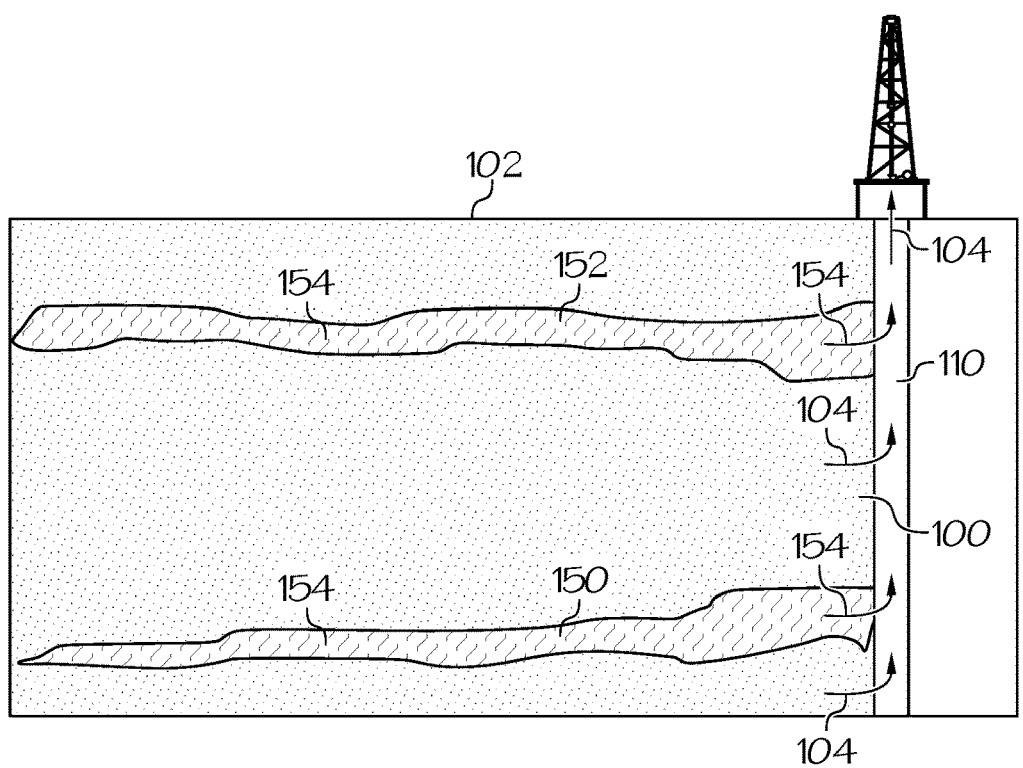
FIG. 5 schematically depicts hydrocarbon production from a production well extending into a hydrocarbon bearing subterranean formation having high permeability zones resulting in a high water cut in fluids extracted from the formation, according to one or more embodiments shown and described in the present disclosure.

High permeability zones in the hydrocarbon bearing subterranean formation can also have an effect at the production well. In particular, high-permeability zones can increase the water cut of fluids produced from the hydrocarbon bearing subterranean formation. Referring now to FIG. 5, hydrocarbon production from a hydrocarbon bearing subterranean formation 100 having one or more high permeability zones 150, 152 is schematically depicted. The production well 110 may extend down into the hydrocarbon bearing subterranean formation 100 and may be operable to provide a fluid flow path between the hydrocarbon bearing subterranean formation 100 and the surface 102 for producing hydrocarbons 104 from the hydrocarbon bearing subterranean formation 100.

The production well 110 may be in fluid communication with one or more high permeability zones 150, 152 in the hydrocarbon bearing subterranean formation 100. The high permeability zones 150, 152 may convey fluids to the production well 110 at a greater rate compared to other less permeable portions of the hydrocarbon bearing subterranean formation 100. Once all the hydrocarbons from the high permeability zones 150, 152 are produced at the production well, the high permeability zones 150, 152 may become saturated with aqueous fluids 154, such as connate water from nearby water zones, aqueous treatment fluids from nearby injection wells, or other water sources. The high-permeability zones 150, 152 may convey these aqueous fluids 154 to the production well 110, where the aqueous fluids 154 are produced along with hydrocarbons 104 from other portions of the hydrocarbon bearing subterranean formation 100. These aqueous fluids 154 from the high permeability zones 150, 152 may, therefore, increase the water cut in the fluids produced from the production well 110.

This increase in water cut caused by aqueous fluids from high permeability zones 150, 152 can cause operational difficulties, such as but not limited to corrosion of pipes, fine migration, and acceleration of well abandonment, if left unchecked. As previously discussed, it is estimated that water comprises about 64% of the total liquid production from oil production wells, which results in more than $40 billion spent annually to deal with this large water volume. To produce the hydrocarbons more cost effectively, techniques to reduce water production have been developed. Some of these existing techniques to reduce water production include chemical as well as mechanical solutions. Such solutions include polymer-gel with cross linker treatment, cement squeeze jobs, and mechanical isolation jobs using packers or plugs. Each of these methods has advantages and limitations.

In the methods of the present disclosure, dense $CO_2$ compositions are used as the main blocking agent for blocking high permeability zones in the hydrocarbon bearing subterranean formation in place of aqueous treatment fluids and cements or mechanical isolation using packers or plugs. It is well-known that $CO_2$ is a major contributor to the greenhouse effect and global warming. $CO_2$ injection into subsurface rocks can contribute to reducing the amount of $CO_2$ in the atmosphere and, thus, assists in mitigating high levels of global warming. The use of dense $CO_2$ instead of water can also help to minimize the use of water and, hence, improve water natural resources preservation. However, dense $CO_2$ by itself may not have adequate viscosity to prevent the dense $CO_2$ from being displaced by other more viscous formation fluids or treatment fluids.

In the methods of the present disclosure, the high permeability zones are injected with a dense $CO_2$ composition that includes the dense $CO_2$ and a thickener. The thickener is an effective, inexpensive, and environmentally friendly thickener that is capable of dissolving readily in dense $CO_2$ at diluted concentrations (concentrations less than or equal to 1 percent by weight) and can increase the viscosity of the dense $CO_2$ by several orders of magnitude under practical conditions for injection into hydrocarbon bearing subterranean formations. In the methods of the present disclosure, the thickened $CO_2$ provided by the dense $CO_2$ compositions disclosed herein are injected into injection wells 120 that have poor performance due to the presence of high permeability zones or fractures. The injected dense $CO_2$ compositions having the thickened viscosity can block these thief flow channels of the high permeability zones and divert the subsequent injected aqueous treatment fluids into previously bypassed areas of the formation. Additionally, the dense $CO_2$ compositions may be injected from the production well 110 into high permeability zones in fluid communication with the production well 110 to reduce the production of water at the production well. The dense $CO_2$ compositions having the thicker viscosity may block the high permeability zones to reduce or prevent the flow of connate water or aqueous treatment fluids into the production well 110.

The dense $CO_2$ composition may include dense $CO_2$ and the thickener, which is soluble in the dense $CO_2$ and operable to increase the viscosity of the dense $CO_2$. The dense $CO_2$ may be $CO_2$ that is not in the gaseous phase. The dense $CO_2$ may be $CO_2$ having a density of greater than or equal to 10,000 moles per cubic meter. The dense $CO_2$ may be liquid or supercritical $CO_2$. Supercritical $CO_2$ refers to $CO_2$ that is at a temperature greater than or equal to the critical temperature of 31° C. and at a pressure greater than the critical pressure of 7.3773 megapascals (MPa) for carbon dioxide. In embodiments, the dense $CO_2$ may be supercritical $CO_2$. The dense $CO_2$ may include $CO_2$ recovered from one or more chemical processes, such as but limited to hydrocarbon refining processes (oil refinery), extracted from the atmosphere, obtained from a chemical gas supplier, or other source of $CO_2$. In embodiments, the $CO_2$ may be pressurized to increase the pressure to greater than or equal to the critical pressure of $CO_2$ to increase the density of the $CO_2$.

The thickener may include a copolymer and one or more co-solvents. The copolymer may be a polymerized reaction product of one or more monomers that include at least one alkenyl ether or dialkenyl ether monomer, at least one acrylate or methacrylate monomer, at least one structural monomer, and at least one allyl ester monomer. In embodiments, the copolymer may be a linear block copolymer.

Alkenyl ether monomers, dialkenyl ether monomers, or both may be included in the copolymer to act as hydrotropes to improve the solubility of the copolymer in one or more of the co-solvents. The alkenyl ether monomers, dialkenyl ether monomers, or both may include but are not limited to one or more of vinyl ether, divinyl ether, ethyl propylene ether, n-propyl vinyl ether. In embodiments, the copolymer may include at least one dialkenyl ether monomer selected from the group consisting of divinyl ether, ethyl propylene ether, n-propyl vinyl ether, and combinations of these. The copolymer may include an amount of alkenyl ether monomer, dialkenyl ether monomers, or both that is sufficient to improve the solubility of the copolymer in aqueous co-solvents, carbon dioxide, and other solvents. In embodiments, the copolymer may include from 15 percent by weight (wt. %) to 35 wt. % alkenyl ether or dialkenyl ether monomers based on the total weight of the copolymer.

The copolymer may include at least one acrylate monomer, at least one methacrylate monomer, or both. The acrylate monomer, methacrylate monomer, or both may be included as a tackifying monomer, which may enhance the thickening abilities of the thickener. Not intending to be bound by any particular theory, it is believed that the acrylate monomer, methacrylate monomer, or both can provide a tackifying group on the molecular chain of the copolymer that may interact with structural groups to enhance the thickening effects of the copolymer. The at least one acrylate monomer, at least one methacrylate monomer, or both may include one or more of methyl acrylate, ethyl acrylate, butyl acrylate, methyl methacrylate, ethyl methacrylate, butyl methacrylate, or combinations of these. In embodiments, the at least one acrylate monomer, at least one methacrylate monomer, or both may be selected from the group consisting of methyl acrylate, ethyl acrylate, butyl acrylate, methyl methacrylate, ethyl methacrylate, butyl methacrylate, and combinations of these. The copolymer may include an amount of acrylate monomer, methacrylate monomer, or both that is sufficient to enhance the viscosity thickening properties of the copolymer. In embodiments, the copolymer may include from 45 wt. % to 70 wt. % acrylate monomer, methacrylate monomer, or both based on the total weight of the copolymer.

The copolymer may include one or more structural monomers that may include long carbon chains or benzene ring structures that interact with the tackifying acrylates and methacrylate groups through various intramolecular and intermolecular forces to build viscosity (increase viscosity). The at least one structural monomer may include an acrylic acid long carbon chain ester, a methacrylic acid long carbon chain ester, styrene, methyl styrene, benzene, phenylpropene, or combinations of these. The at least one structural monomer may be selected from the group consisting of an acrylic acid long carbon chain ester, a methacrylic acid long carbon chain ester, styrene, methyl styrene, benzene, phenylpropene, and combinations of these. The acrylic acid long carbon chain ester, the methacrylic acid long carbon chain ester, or both may include a carbon chain length of from 8 carbons to 18 carbons. The copolymer may include an amount of structural monomers sufficient to increase the viscosity to enhance the thickening properties of the copolymer. In embodiments, the copolymer may include from 8 wt. % to 20 wt. % structural monomers based on the total weight of the copolymer.

The copolymer may also include an allyl ester monomer which may provide an affinity for carbon dioxide to improve the solubility of the copolymer in dense carbon dioxide. The at least one allyl ester monomer may include an allyl methyl ester, an allyl ethyl ester, or a combination of these. In embodiments, the at least one allyl ester monomer may include allyl methyl carbonate, allyl ethyl carbonate, or a combination of these. The copolymer may include an amount of the allyl ester monomer that is sufficient to provide adequate solubility of the copolymer in carbon dioxide, such as the dense $CO_2$. In embodiments, the copolymer may include from 2 wt. % to 12 wt. % allyl ester monomers based on the total weight of the copolymer.

The thickener may include from 5 wt. % to 10 wt. % alkenyl ether monomers, dialkenyl monomers, or both based on the total weight of the thickener, including both the copolymer and co-solvents. The thickener may include from 15 wt. % to 20 wt. % acrylate monomers, methacrylate monomers, or both based on the total weight of the thickener, including both the copolymer and co-solvents. The thickener may include from 3 wt. % to 5 wt. % structural monomers based on the total weight of the thickener, including both the copolymer and co-solvents. The thickener may include from 1 wt. % to 3 wt. % allyl ester monomers based on the total weight of the thickener, including both the copolymer and co-solvents.

As previously discussed, the thickener may include one or a plurality of co-solvents. The co-solvents may be included to improve the solubility of the copolymer in the dense $CO_2$. The co-solvents may also be included in the reaction mixture prior to polymerization to act as a solvent medium for the polymerization reaction. The co-solvents may include but are not limited to one or more of propylene carbonate, allyl ethyl carbonate, dimethyl carbonate, white oil, silicon oil, petroleum ether, or combinations of these. The co-solvents may include one or a plurality of solvents selected from the group consisting of propylene carbonate, allyl ethyl carbonate, dimethyl carbonate, white oil, silicon oil, petroleum ether, and combinations of these. The thickener may include greater than or equal to 50 wt. % co-solvents, greater than or equal to 60 wt. % co-solvents, or even greater than or equal to 70 wt. % co-solvents based on the total weight of the thickener, including the copolymer and all of the co-solvents. In embodiments, the thickener may include from 50 wt. % to 80 wt. % co-solvents, from 50 wt. % to 75 wt. % co-solvents, or from 60 wt. % to 70 wt. % co-solvents based on the total weight of the thickener, including the copolymer and all of the co-solvents.

The thickener may include at least one carbon dioxide compatible co-solvent that may operate to increase solubility of the thickener in the dense $CO_2$. The carbon dioxide compatible co-solvent may include propylene carbonate, allyl ethyl carbonate, dimethyl carbonate, or combinations of these. In embodiments, the thickener may include propylene carbonate, dimethyl carbonate, or a combination of these as the carbon dioxide compatible co-solvent. The thickener may include an amount of the carbon dioxide compatible co-solvent sufficient to increase the solubility of the thickener in the dense $CO_2$. In embodiments, the thickener may include from 40 wt. % to 65 wt. % carbon dioxide compatible co-solvent based on the total weight of the thickener, including the copolymer and all co-solvents.

The co-solvent may additionally include one or a plurality of oil dissolving co-solvents. The oil dissolving co-solvents may include, but are not limited to white oil, silicon oil, petroleum ether, or combinations of these. In embodiments, the thickener may include one or a plurality of the oil dissolving co-solvents selected from the group consisting of white oil, silicon oil, petroleum ether, and combinations of these. The thickener may include from 10 wt. % to 15 wt. % oil dissolving co-solvent based on the total weight of the thickener, including the copolymer and all of the co-solvents.

The thickener may be made through polymerization of the various monomers dispersed in the co-solvents to produce an emulsion comprising the copolymer dispersed in the co-solvents. In a first step of the process, the monomers may be dispersed in the co-solvents. The carbon dioxide compatible co-solvent and the oil dissolving co-solvent are added in the proportions previous discussed in this disclosure to a vessel maintained at from 30° C. to 40° C. While stirring, the alkenyl ether or dialkenyl ether monomers, acrylate or methacrylate monomers, structural monomers, and allyl ester monomers may be added sequentially according to the proportions previously discussed. The monomers and co-solvents of the present disclosure are all commercially available. The mixture may be stirred until the monomers are completely dissolved in the co-solvents.

The polymerization reaction may then be initiated by adding an oil-soluble chain transfer agent and an oil-soluble polymerization initiator, sealing the reaction vessel, and heating the reaction vessel to a reaction temperature of from 90° C. to 100° C. The oil-soluble initiator may include azobisisobutyronitrile, azobisisoheptonitrile, benzoyl peroxide or combinations of these. The oil-soluble initiator may be added in an amount of from 0.5 wt. % to 1.0 wt. % oil-soluble initiator based on the total weight of the polymerization mixture. The oil-soluble chain transfer agent may comprise butyl mercaptan, dodecyl mercaptan, hexadecyl mercaptan, or combinations of these. The polymerization reaction mixture may include from 0.5 wt. % to 1.0 wt. % oil-soluble chain transfer agent based on the total weight of the polymerization reaction mixture. The oil-soluble chain transfer agent may be added first, followed by the oil-soluble initiator. After adding these components and sealing the reactor vessel, the reactor vessel may be maintained at the reaction temperature of 90° C. to 100° C. and a pressure less than or equal to 0.4 MPa for a reaction duration of 8 hours to 12 hours. After the reaction duration, the reaction vessel may be cooled to ambient temperature with the contents of the reaction vessel being the thickener of the present disclosure.

The thickener of the present disclosure may be an emulsion of the copolymer in the co-solvents. The copolymer of the thickener may have a weight average molecular weight of from 500,000 grams per mole to 800,000 grams per mole. The thickener may have an acidic pH. In particular, the thickener may have a pH of from 5.0 to 8.0. The thickener may have a specific gravity of from 0.90 to 1.10.

The thickener may be readily soluble in dense $CO_2$ (liquid or supercritical). For instance, the thickener may have a solubility in dense $CO_2$ such that 1 percent by weight of the thickener dissolves in dense $CO_2$ in less than or equal to 3 minutes at 25 degrees Celsius. Not intending to be bound by any particular theory, it is believed that the carbon dioxide compatible co-solvent and the oil-dissolving co-solvent have an affinity for the dense $CO_2$ such that the carbon dioxide compatible co-solvent and the oil-dissolving co-solvent are quickly dispersed and dissolved in the dense $CO_2$ while carrying the copolymer in rapid dispersion in dense $CO_2$. Because the copolymer is directly dissolved in the mixture of the carbon dioxide compatible co-solvent and the oil-dissolving co-solvent, it is believed that the molecular chain of the copolymer may be in a pre-stretched state so that solubilizing groups and the strong carbon dioxide-philic groups on the molecular chain (such as the allyl ester groups provided by the allyl ester monomer) can quickly interact with the dense $CO_2$ to solubilize the copolymer in the dense $CO_2$. The thickener may be readily soluble in dense $CO_2$ at temperatures of from 20° C. to 150° C. At temperatures less than 20° C., the thickener may dissolve more slowly in the dense $CO_2$, but may still be soluble in the dense $CO_2$.

The thickener may be operable to increase the viscosity of dense $CO_2$ when added to the dense $CO_2$ to produce the dense $CO_2$ compositions. Not intending to be bound by any particular theory, it is believed that intermolecular and intramolecular interactions between the structural groups (provided by the structural monomers) and the acrylate groups (provided by the acrylate and methacrylate monomers) of the copolymer molecules may result in a thickening effect that increases the viscosity of the dense $CO_2$ compositions. The dense $CO_2$ compositions of the present disclosure may include an amount of the thickener that is sufficient to increase the viscosity of the dense $CO_2$ compositions but not so much that the increase in the viscosity of the dense $CO_2$ composition causes fracture of the subterranean formation into which the dense $CO_2$ is injected. When added to the dense $CO_2$, the amount of the thickener may be sufficient to increase the viscosity of the dense $CO_2$ composition by greater than or equal to 100 times, or greater than or equal to 200 times, the viscosity of the dense $CO_2$ without the thickener. In embodiments, the amount of the thickener may be sufficient to increase the viscosity of the dense $CO_2$ composition by from 100 to 1300 times the viscosity of the dense $CO_2$ without the thickener.

The amount of thickener in the dense $CO_2$ composition may depend on the specific application and the characteristics of the formation being treated. The dense $CO_2$ composition may have a concentration of the thickener sufficient to increase the viscosity of the dense $CO_2$ composition to improve the blocking effectiveness, but not so much that the viscosity of the dense $CO_2$ composition causes fracture of the formation. The dense $CO_2$ composition may include greater than or equal to 0.05 wt. %, greater than or equal to 0.1 wt. % or even greater than 0.2 wt. % thickener based on the total weight of the dense $CO_2$ composition. When the amount of the thickener is less than 0.05 wt. %, the concentration of the thickener may not be great enough to increase the viscosity of the dense $CO_2$ composition sufficiently to prevent the dense $CO_2$ composition from being swept from the pores and fractures of the high permeability zones in the formation. The dense $CO_2$ composition may include less than or equal to 3.0 wt. %, less than or equal to 1 wt. %, less than or equal to 0.5 wt. %, less than or equal to 0.3 wt. % or less than or equal to 0.2 wt. % thickener based on the total weight of the dense $CO_2$ composition. Depending on the nature of the formation, a concentration of the thickener in the dense $CO_2$ composition that is too great may increase the viscosity of the dense $CO_2$ composition to a degree that causes the fracture of the subterranean formation into which the dense $CO_2$ composition is injected. The balance of the dense $CO_2$ compositions may comprise the dense $CO_2$.

The dense $CO_2$ compositions may be prepared by providing dense $CO_2$ at a pressure and temperature greater than or equal to the critical pressure and critical temperature of $CO_2$. While maintaining the pressure and temperature of the dense $CO_2$, the thickener may be added to the dense $CO_2$ and the mixture may be mixed for a period of time sufficient to completely disperse and dissolve the thickener in the dense $CO_2$ to produce the dense $CO_2$ composition. In embodiments, the dense $CO_2$ and thickener may be mixed for a period of time greater than or equal to 3 minutes, or even greater than or equal to 5 minutes.

The dense $CO_2$ composition comprising the dense $CO_2$ and the thickener may have a viscosity greater than the dense $CO_2$ without the thickener. The dense $CO_2$ composition may have a viscosity of greater than or equal to 50 millipascal seconds (mPa.$), greater than or equal to 75 millipascal seconds, or even greater than or equal to 100 millipascal seconds, where the viscosity is determined using a Cambridge viscometer apparatus. The dense $CO_2$ composition may have a viscosity of less than or equal to 150 millipascal seconds, less than or equal to 125 millipascal seconds, or even less than or equal to 100 millipascal seconds, where the viscosity is determined using a Cambridge viscometer apparatus. The dense $CO_2$ composition may have a viscosity of from 50 millipascal seconds to 150 millipascal seconds, from 50 millipascal seconds to 125 millipascal seconds, or from 75 millipascal seconds to 150 millipascal seconds. Below a viscosity of about 50 millipascal seconds, the dense $CO_2$ composition may not have sufficient viscosity to remain in the pores of the formation and may be at least partially swept from the treated region of the subterranean formation by subsequent water flooding or hydrocarbon production activities. Above a viscosity of about 150 millipascal seconds, the dense $CO_2$ composition may cause fracture of the subterranean formation during injection into the subterranean formation.

Figure 2:
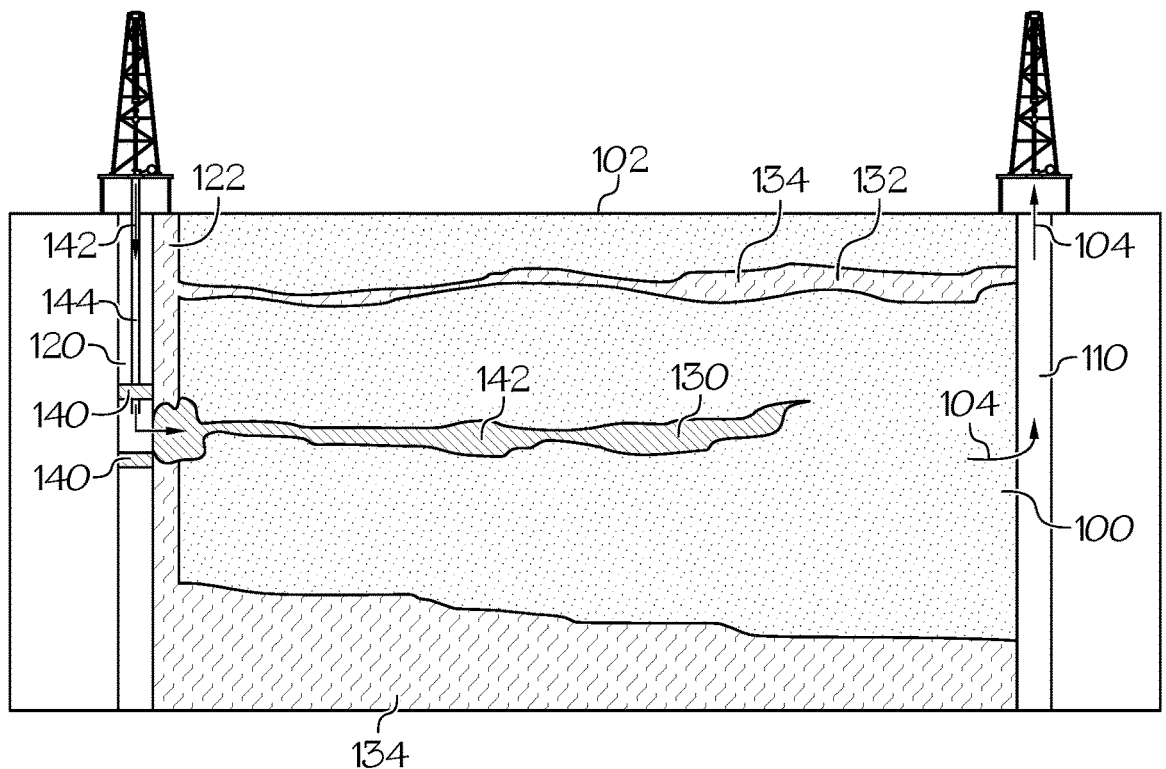
FIG. 2 schematically depicts injection of a dense $CO_2$ composition from an injection well into a first high permeability zone of the hydrocarbon bearing subterranean formation in FIG. 1, according to one or more embodiments shown and described in the present disclosure.
Figure 3:
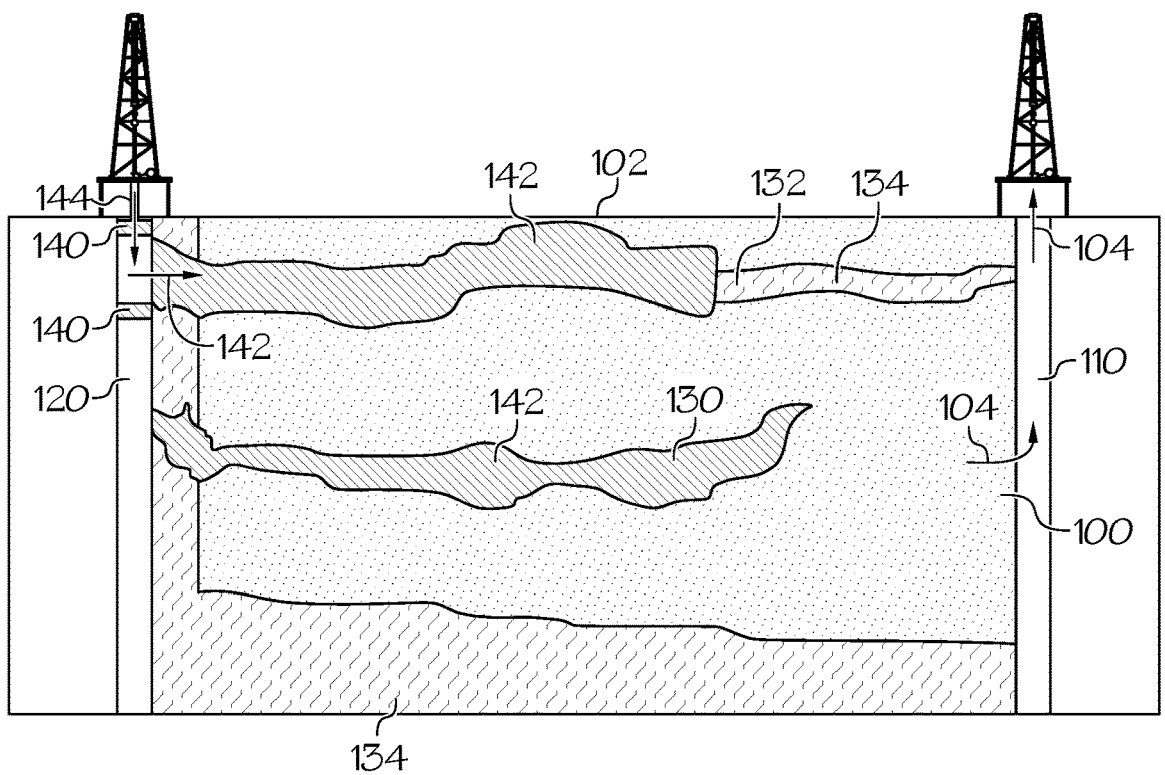
FIG. 3 schematically depicts injection of the dense $CO_2$ composition from the injection well into a second high permeability zone of the hydrocarbon bearing subterranean formation of FIG. 1, according to one or more embodiments shown and described in the present disclosure.
Figure 4:
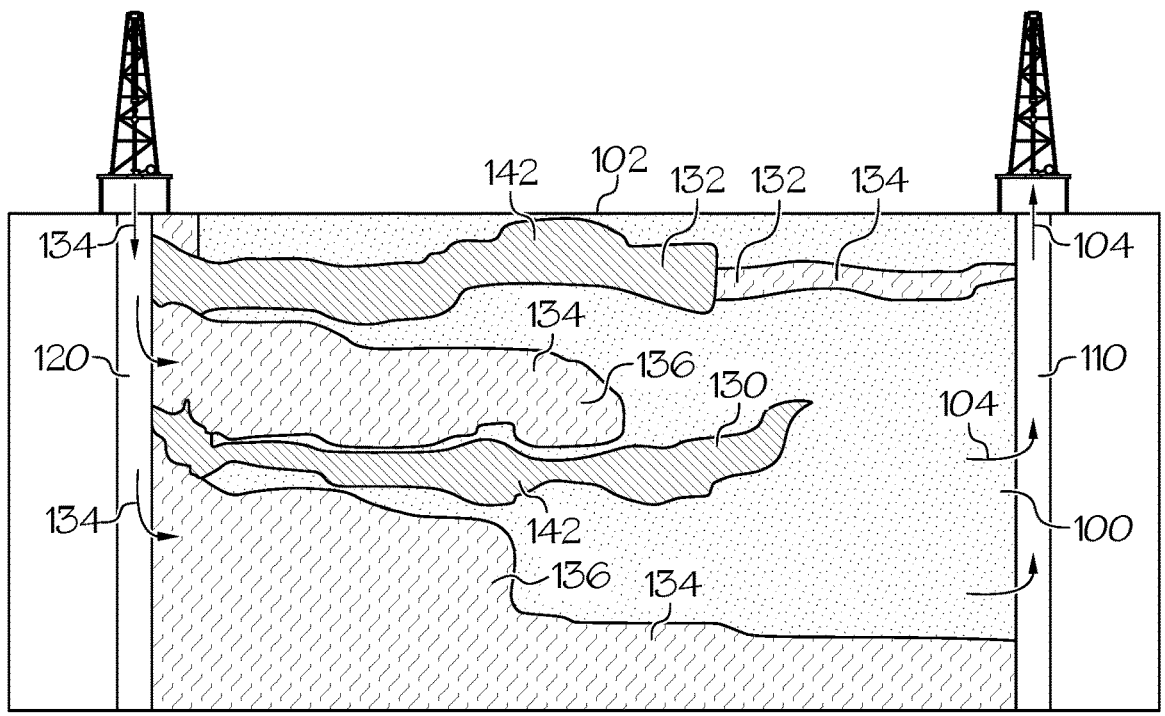
FIG. 4 schematically depicts water flooding enhanced oil recovery of the hydrocarbon bearing subterranean formation of FIG. 1 subsequent to treating the high permeability zones with the dense $CO_2$ composition, according to one or more embodiments shown and described in the present disclosure.

As previously discussed, the dense $CO_2$ compositions comprising dense $CO_2$ and the thickener may be used in methods of enhanced oil recovery to block high permeability zones in a hydrocarbon bearing subterranean formation to improve the efficiency and effectiveness of water flooding methods for increasing production of hydrocarbons from the hydrocarbon bearing subterranean formation. Referring again to FIG. 1, the methods of the present disclosure for enhanced oil recovery from the hydrocarbon bearing subterranean formation 100 may include withdrawing hydrocarbons 104 from the production well 110 extending into the hydrocarbon bearing subterranean formation 100 and identifying one or more high permeability zones 130, 132 in the hydrocarbon bearing subterranean formation 100. Referring to FIGS. 2 and 3, the methods for enhanced oil recovery include injecting the dense $CO_2$ composition 142 from an injection well 120 into the high permeability zones 130, 132 of the hydrocarbon bearing subterranean formation 100. The dense $CO_2$ composition 142 may include dense $CO_2$ and the thickener, each of which may have any of the features, compositions, or characteristics previously discussed in the present disclosure. In particular, the thickener may be soluble in the dense $CO_2$ and may include a copolymer that is the polymerized reaction product of monomers that include at least one alkenyl ether or dialkenyl ether monomer; at least one acrylate or methacrylate monomer; at least one structural monomer; and at least one allyl ester monomer. Referring to FIG. 4, after injecting the dense $CO_2$ composition 142 into the high permeability zones 130, 132, the method for enhanced oil recovery may include injecting an aqueous treatment fluid 134 from the injection well 120 into the hydrocarbon bearing subterranean formation 100. The dense $CO_2$ composition 142 may block the high permeability zones 130, 132 to divert at least a portion of the aqueous treatment fluid 134 into bypassed regions of the hydrocarbon bearing subterranean formation 100 during the injecting of the aqueous treatment fluid 134 into the hydrocarbon bearing subterranean formation 100 after injection of the dense $CO_2$ composition 142. The injecting of the aqueous treatment fluid 134 into the hydrocarbon bearing subterranean formation 100 after treating the high permeability zones 130, 132 may drive hydrocarbons 104 in the hydrocarbon bearing subterranean formation 100 towards the production well 110.

The hydrocarbon bearing subterranean formation 100 may be any type of rock formation in which hydrocarbon deposits are typically found, and the methods of the present disclosure are not intended to be limited to any specific type of rock formation of the hydrocarbon bearing subterranean formation 100. In embodiments, the hydrocarbon bearing subterranean formation 100 may be carbonate rock, sandstone rock, or a combination of these.

Referring again to FIG. 1, the high permeability zones 130, 132 may include portions of the hydrocarbon bearing subterranean formation 100 having a greater permeability, such as greater porosity, compared to the rest of the formation or may include fractures in the hydrocarbon bearing subterranean formation 100. In embodiments, the high permeability zones 130, 132 may be in direct fluid communication with the injection well 120 such that fluids can flow directly from the injection well 120 into the high permeability zone 130, 132 without first passing through another portion of the formation. In embodiments, the high permeability zones 130, 132 may be in fluid communication with a water flooded region 122, which may in turn be in fluid communication with the injection well 120. The hydrocarbon bearing subterranean formation 100 may include one or a plurality of high permeability zones 130, 132. Although shown in FIGS. 1-4 as having two high permeability zones 130, 132, it is understood that the hydrocarbon bearing subterranean formation 100 may have one, three, four, or more than four high permeability zones 130, 132. Methods for identifying and locating the high permeability zones 130, 132 in the hydrocarbon bearing subterranean formation 100 may include analyzing well log information obtained from wireline well logging tools. High permeability zones 130, 132 may also be identified and located through various formation mapping techniques such as but not limited to seismic surveys or formation mapping through injection of tracer compounds, examples of which may include but are not limited to molecules or nanoparticles that can be tracked as they travel through the hydrocarbon bearing subterranean formation 100. Other known techniques for identifying high permeability zones 130,132 in the hydrocarbon bearing subterranean formation 100 are contemplated.

Referring now to FIGS. 2 and 3, once the high permeability zones 130, 132 have been identified and located, the dense $CO_2$ composition 142 may be injected into each of the high permeability zones 130, 132. Injecting the dense $CO_2$ composition 142 may include isolating a portion of the injection well 120 that is in fluid communication with the high permeability zone 130, 132 from other portions of the injection well 120 before injection the dense $CO_2$ composition into the high permeability zone 130, 132. Isolating the portion of the injection well 120 that is in fluid communication with the high permeability zone 130, 132 may include installing one or more temporary plugs 140 in the injection well 120. The temporary plugs 140 may be installed and disposed downhole of the portion of the injection well 120 in fluid communication with the high permeability zone 130, 132 or both uphole and downhole of the portion of the injection well 120 in fluid communication with the high permeability zone 130, 132. Referring to FIG. 2, in embodiments, the temporary plugs 140 may be disposed uphole and downhole of the high permeability zone 130 being treated to fluidly isolate the portion of the injection well 120 that is in fluid communication with the high permeability zone 130 from uphole and downhole portions of the injection well 120.

Each temporary plug 140 may be a composition or mechanical apparatus capable of fluidly isolating a portion of a wellbore for a specified duration and capable of being removed from the wellbore to restore fluid communication. Each of the temporary plugs 140 may be a mechanical plug, such as a packer or other mechanical device capable of sealing off the injection well 120 at a particular downhole location and then being removed once injection of the dense $CO_2$ composition 142 is completed. Alternatively or additionally, in embodiments, each of the temporary plugs 140 may be a temporary gel plug that may include a gelling polymer that creates a semi-solid or solid plug when installed downhole. Temporary gel plugs may be removed from the injection well by introducing chemicals to break up or dissolve the gel formed by the gelling polymer or by mechanically piercing or removing the temporary gel plug. Once the dense $CO_2$ composition 142 is injected into the high permeability zone 130, 132, the temporary plugs 140 may be removed from the injection well 120.

The dense $CO_2$ composition 142 may be injected from the injection well 120 into the high permeability zones 130, 132 by known methods. In embodiments, the dense $CO_2$ composition 142 may be injected from the injection well 120 into the high permeability zones 130, 132 through a conduit 144 extending from the surface 102 of the injection well 120 downhole to the portion of the injection well 120 in fluid communication with the high permeability zone 130, 132 (the portion of the injection well 120 isolated by the temporary plugs 140). The conduit 144 may include, but is not limited to, coiled tubing, wireline, a jointed pipe string, or other type of conduit.

The dense $CO_2$ composition 142 may be injected at the temperature of the hydrocarbon bearing subterranean formation 100 at the high permeability zones 130, 132. In embodiments, the dense $CO_2$ composition 142 may be injected into the high permeability zones 130, 132 at a temperature of from 20° C. to 250° C., such as from 25° C. to 200° C., or from 25° C. to 150° C. The dense $CO_2$ composition 142 may be injected into the high permeability zones 130, 132 at a pressure greater than the critical pressure of $CO_2$, such as a pressure greater than or equal to 7.3773 megapascals. The dense $CO_2$ composition 142 may be injected into the high permeability zones 130, 132 at a pressure equal to the formation pressure of the hydrocarbon bearing subterranean formation 100. The dense $CO_2$ composition 142 may be injected into the high permeability zones 130, 132 at a pressure of from 1,000 psi (6.9 megapascals) to 3,000 psi (20.7 megapascals). The pressure at which the dense $CO_2$ composition 142 is injected into the high permeability zones 130, 132 may be less than a pressure that causes fracture of the formation.

Injection of the dense $CO_2$ composition 142 may be characterized by an injection duration, an injection volume, or both that are sufficient to adequately block the high permeability zones 130, 132 to reduce or prevent aqueous treatment fluids from flowing into the high permeability zones 130, 132 during subsequent water flooding. The dense $CO_2$ composition 142 may be injected into each high permeability zone 130, 132 for a duration of from 0.5 hours to 24 hours. The volume of dense $CO_2$ composition 142 injected into each high permeability zone 130, 132 may be sufficient to block the high permeability zone 130, 132 and divert subsequent treatment fluids to other portions of the hydrocarbon bearing subterranean formation 100. The volume of dense $CO_2$ composition 142 injected into each high permeability zone 130, 132 may depend on the porosity of the high permeability zone 130, 132, which may be characterized by a total pore volume of the high permeability zone 130, 132. In embodiments, the volume of dense $CO_2$ composition injected into each of the high permeability zones 130, 132 may be from 0.1 to 1.0 or from 0.1 to 0.5 times the total pore volume (PV) of the high permeability zone being treated.

Injection of the dense $CO_2$ compositions 142 into the high permeability zones 130, 132 may displace fluids, such as aqueous formation fluids, aqueous treatment fluids, or other fluids, in the high permeability zone 130, 132. The dense $CO_2$ compositions 142 may also penetrate outward from the high permeability zone 130, 132 into the pores of the formation surrounding the high permeability zone 130, 132. The increased viscosity of the dense $CO_2$ compositions 142 provided by the thickener may be sufficient to prevent subsequent fluid flow in the formation from displacing the dense $CO_2$ compositions 142 from the high permeability zones 130, 132. Thus, the injection of the dense $CO_2$ composition 142 into the high permeability zones 130, 132 may reduce the permeability of the formation in the high permeability zones 130, 132, which may reduce or prevent aqueous treatment fluids in subsequent water flooding steps from flowing into and through the high permeability zones 130, 132. The injected dense $CO_2$ composition 142 may reduce the permeability of the formation in the high permeability zones 130, 132 by greater than or equal to 50%, greater than or equal to 70%, greater than or equal to 80%, greater than or equal to 90% or even greater than or equal to 95%. In embodiments, the hydrocarbon bearing subterranean formation 100 may be carbonate rock, and the injection of the dense $CO_2$ composition may reduce the permeability of carbonate rock by greater than or equal to 50%, greater than or equal to 70%, greater than or equal to 80%, greater than or equal to 90% or even greater than or equal to 95%. Injection of the dense $CO_2$ composition 142 having the increased viscosity does not fracture the formation in the high permeability zones 130, 132 or any other region in which the dense $CO_2$ composition 142 flows. The reduced permeability of the high permeability zones 130, 132 caused by injection of the dense $CO_2$ composition 142 may act as a barrier to reduce or prevent fluid flow into and through the high permeability zones 130, 132 and divert subsequent treatment fluids to other regions of the hydrocarbon bearing subterranean formation 100, such as bypassed regions of the hydrocarbon bearing subterranean formation 100.

Referring to FIGS. 2 and 3, each of the high permeability zones 130, 132 may be treated with the dense $CO_2$ composition 142 sequentially. Referring to FIG. 2, the hydrocarbon bearing subterranean formation 100 may include a first high permeability zone 130 and a second high permeability zone 132. The first high permeability zone 130 may be fluidly isolated from the rest of the injection well 120 and hydrocarbon bearing subterranean formation 100 by installing the temporary plugs 140 uphole and downhole of the first high permeability zone 130, as previously described. The dense $CO_2$ composition 142 may then be injected into the first high permeability zone 130 to treat the first high permeability zone 130. In embodiments, the temporary plugs 140 isolating the first high permeability zone 130 may be removed from the injection well 120 after injection of the dense $CO_2$ composition 142. In embodiments, such as when the first high permeability zone is downhole of the second high permeability zone 132, the temporary plugs 140 isolating the first high permeability zone 130 may be left in the injection well 120 until after treating the second high permeability zone 132.

Referring now to FIG. 3, after treating the first high permeability zone 130, the second high permeability zone 132 may be treated with the dense $CO_2$ composition 142. The portion of the injection well 120 in fluid communication with the second high permeability zone 132 may be fluidly isolated from the rest of the injection well 120 by installing the temporary plugs 140 uphole and downhole of the second high permeability zone 132. Once the second high permeability zone 132 is isolated, the dense $CO_2$ compositions 142 may be injected into the second high permeability zone 132 to block the second high permeability zone 132. The temporary plugs 140 isolating the second high permeability zone 132 may then be removed following injection of the dense $CO_2$ composition 142. The process of isolation, injection, and de-isolation may be repeated for additional high permeability zones in fluid communication with the injection well 120 until all the high permeability zones have been treated.

Referring now to FIG. 4, after treating each of the high permeability zones 130, 132 by injecting the dense $CO_2$ composition 142, water flooding operations may be commenced or resumed. After injecting the dense $CO_2$ composition 142 into the high permeability zones 130, 132, the methods of enhanced oil recovery may include injecting the aqueous treatment fluid 134 from the injection well 120 into the hydrocarbon bearing subterranean formation 100.

The aqueous treatment fluid 134 may include water. The water used in the aqueous treatment fluid 134 may be in the form of an aqueous solution containing additives or impurities. The water comprises one or more of freshwater, seawater, natural brine, synthetic brine, salt water, municipal water, well water, formation/connate water, produced water, brackish water, distilled water, deionized water, water produced from crude oil desalting processes, or combinations of these. Salts may be present in or incorporated into the water. Salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these.

In embodiments, the aqueous treatment fluid 134 may include one or more oilfield additives to modify one or more properties of the aqueous treatment fluid 134. Oilfield additives may include but are not limited to one or more viscosifiers, surfactants, stabilizers, pH control agents, scale inhibitors, polymers, nanoparticles, tracer compounds, or combinations of these. Other typical oilfield additives commonly used in water flooding processes are contemplated.

Referring again to FIG. 4, the aqueous treatment fluids 134 may be injected from the injection well 120 into the hydrocarbon bearing subterranean formation 100 using known methods. In embodiments, the aqueous treatment fluids 134 may be injected from the injection well 120 into the hydrocarbon bearing subterranean formation 100 through a conduit, such as but not limited to coiled tubing, wireline, a jointed pipe string, or other type of conduit. In embodiments, the aqueous treatment fluids 134 may be injected from the wellbore casing itself. Other devices or processes for injecting the aqueous treatment fluids 134 into the hydrocarbon bearing subterranean formation 100 are contemplated. The dense $CO_2$ compositions 142 injected into the high permeability zones 130, 132 may provide a barrier that blocks the high permeability zones 130, 132 and diverts at least a portion of the aqueous treatment fluid 134 into bypassed regions 136 of the hydrocarbon bearing subterranean formation 100 during the injecting of the aqueous treatment fluids 134 into the hydrocarbon bearing subterranean formation 100.

The aqueous treatment fluids 134 injected into the hydrocarbon bearing subterranean formation 100 may flow generally from the injection well 120 towards the production well 110. The flow of aqueous treatment fluids 134 into the hydrocarbon bearing subterranean formation 100 may displace hydrocarbons in the bypassed regions 136 of the hydrocarbon bearing subterranean formation 100. The aqueous treatment fluids 134 flowing into the bypassed regions 136 of the hydrocarbon bearing subterranean formation 100 may exert pressure on the hydrocarbon fluids to provide motive force for driving the hydrocarbons 104 towards the production well 110. While injecting the aqueous treatment fluids 134 at the injection well 120, the hydrocarbons 104 may be produced at the production well 110. The methods of the present disclosure may include withdrawing the hydrocarbons 104 from the production well 110.

The methods of the present disclosure for enhancing oil recovery from hydrocarbon bearing subterranean formations may further include preparing the dense $CO_2$ composition 142. Preparing the dense $CO_2$ composition 142 may include providing dense $CO_2$, combining the thickener with the dense $CO_2$, and mixing the dense $CO_2$ and thickener for a period of time sufficient to completely dissolve the thickener in the dense $CO_2$ to produce the dense $CO_2$ composition, as previously discussed in the present disclosure. In embodiments, the dense $CO_2$ composition may be prepared at the surface 102 immediately prior to injection into the injection well 120.

Figure 6:
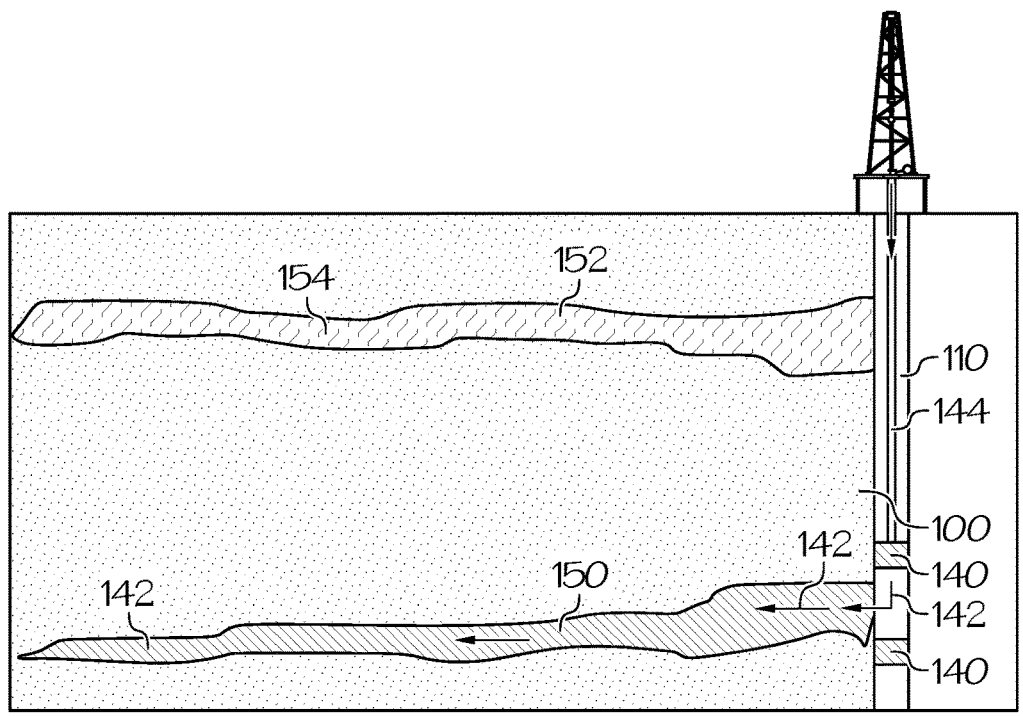
FIG. 6 schematically depicts injection of a dense $CO_2$ composition from the production well of FIG. 5 into a first high permeability zone, according to one or more embodiments shown and described in the present disclosure.
Figure 7:
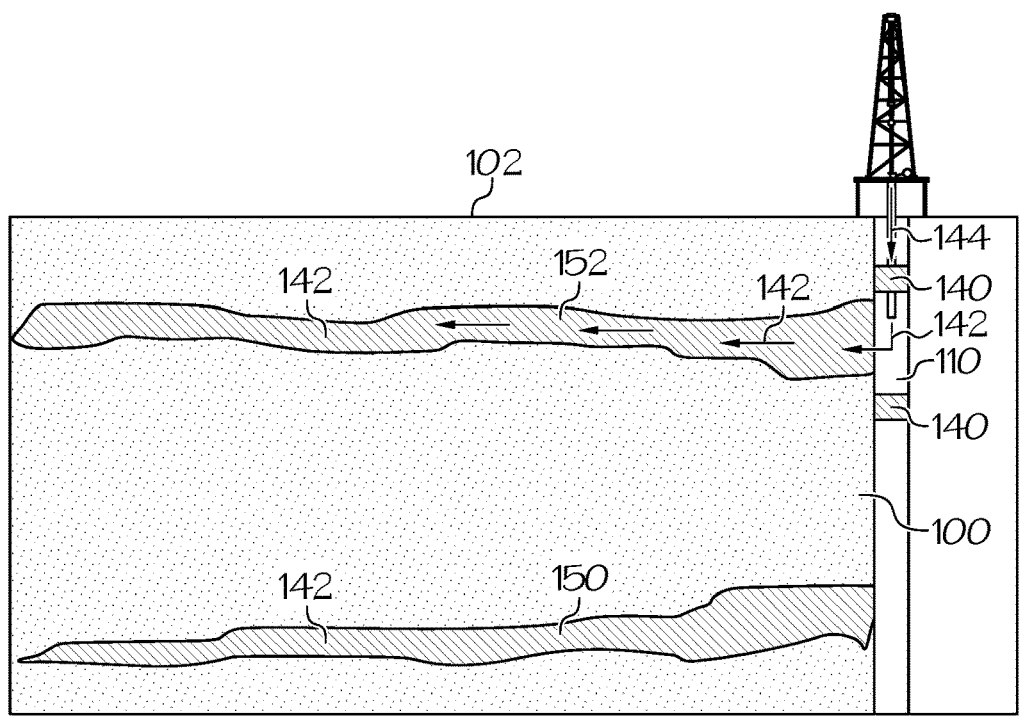
FIG. 7 schematically depicts injection of the dense $CO_2$ composition from the production well into a second high permeability zone of the hydrocarbon bearing subterranean formation of FIG. 5, according to one or more embodiments shown and described in the present disclosure.
Figure 8:
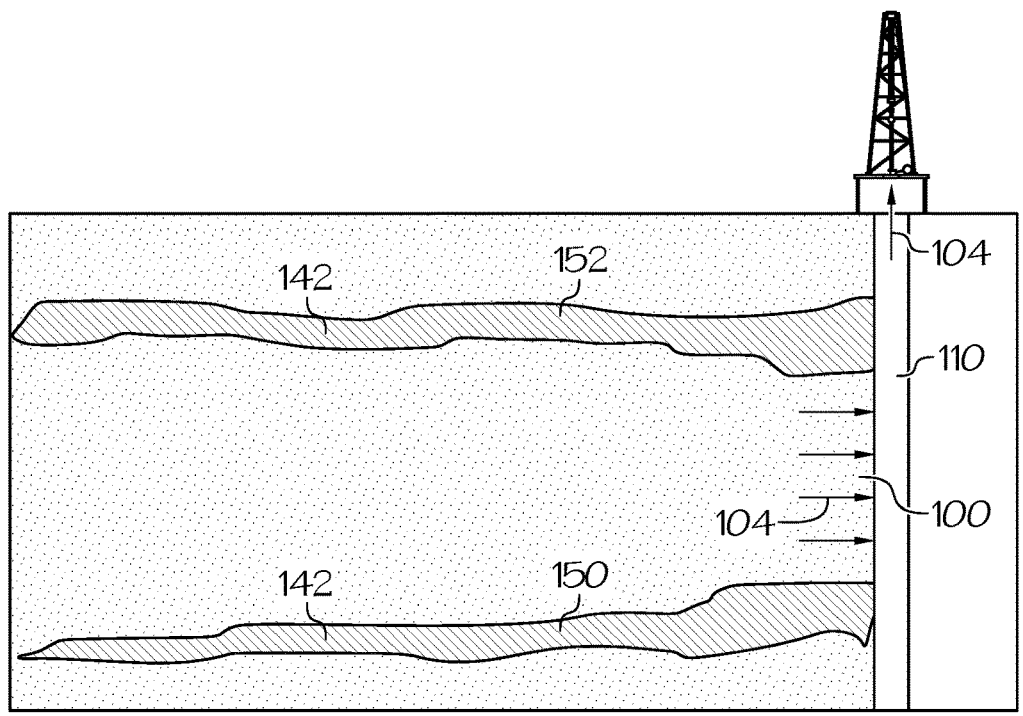
FIG. 8 schematically depicts production of hydrocarbons from the hydrocarbon bearing subterranean formation subsequent to injection of the dense $CO_2$ composition into the high permeability zones, according to one or more embodiments shown and described in the present disclosure.

As previously discussed, the dense $CO_2$ compositions comprising dense $CO_2$ and the thickener may be used to reduce water production at the production well by injecting the dense $CO_2$ compositions from the production well into high permeability zones in fluid communication with the production well. Reducing water production by treating the high permeability zones in fluid communication with the production well may reduce the cost and improve the economic efficiency of producing hydrocarbons from the hydrocarbon bearing subterranean formation. Referring now to FIG. 5, the methods of the present disclosure for reducing water production from a hydrocarbon bearing subterranean formation 100 may include identifying one or more high permeability zones 150, 152 in the hydrocarbon bearing subterranean formation 100. Referring to FIGS. 6 and 7, the methods for reducing water production may further include injecting the dense $CO_2$ composition 142 from the production well 110 into each of the high permeability zones 150, 152. The dense $CO_2$ composition 142 may include the dense $CO_2$ and the thickener, each of which may have any of the features, compositions, or characteristics previously discussed in the present disclosure. In particular, the thickener may be soluble in the dense $CO_2$ and may comprise a copolymer that is the polymerized reaction product of monomers that include at least one alkenyl ether or dialkenyl ether monomer; at least one acrylate or methacrylate monomer; at least one structural monomer; and at least one allyl ester monomer. Referring to FIG. 8, after injecting the dense $CO_2$ composition 142 into the high permeability zones 150, 152, the methods of reducing water production may include withdrawing hydrocarbons 104 from the hydrocarbon bearing subterranean formation 100 through the production well 110. The dense $CO_2$ composition may block pores, fractures, or both in the high permeability zones 150, 152 to reduce or prevent flow of water from the high permeability zones 150, 152 into the production well 110. This may reduce the production of water from the hydrocarbon bearing subterranean formation 100 and may improve the economic efficiency of hydrocarbon production from the production well 110, among other features of the methods.

As previously discussed, the hydrocarbon bearing subterranean formation 100 may be any type of rock formation in which hydrocarbon deposits are typically found, and the methods of the present disclosure are not intended to be limited to any specific type of rock formation of the hydrocarbon bearing subterranean formation 100. In embodiments, the hydrocarbon bearing subterranean formation 100 may be carbonate rock, sandstone rock, or a combination of these.

Referring again to FIG. 5, the high permeability zones 150, 152 may include portions of the hydrocarbon bearing subterranean formation 100 having a greater permeability, such as greater porosity, compared to the rest of the formation or may include fractures in the hydrocarbon bearing subterranean formation 100. The high permeability zones 150, 152 may be in direct fluid communication with the production well 110 such that fluids can flow directly from the high permeability zones 150, 152 into the production well 110 without first passing through other portions of the subterranean formation. The hydrocarbon bearing subterranean formation 100 may include one or a plurality of high permeability zones 150, 152 in fluid communication with the production well 110. Although shown in FIGS. 5-8 as having two high permeability zones 150, 152, it is understood that the hydrocarbon bearing subterranean formation 100 may have one, three, four, or more than four high permeability zones 150, 152. The high permeability zones 150, 152 may be in fluid communication with one or more water zones (not shown) in the hydrocarbon bearing subterranean formation 100, such as but not limited to a water zone comprising connate water or one or more water flood regions 122 (FIG. 1). When untreated, these high permeability zones 150, 152 in fluid communication with the production well 110 can provide a flow path that enables connate water from water zones, aqueous treatment fluids from water flood regions 122, or both to flow to the production well 110, which increases the water production at the production well 110.

Identifying and locating the high-permeability zones 150, 152 may include analyzing well log information obtained from wireline well logging tools or identifying the high permeability zones 150, 152 through formation mapping techniques, as previously discussed in the present disclosure in relation to FIGS. 1-4.

Referring now to FIGS. 6 and 7, once the high permeability zones 150, 152 have been identified and located, the dense $CO_2$ composition 142 may be injected from the production well 110 into each of the high permeability zones 150, 152. Injecting the dense $CO_2$ composition 142 may include isolating a portion of the production well 110 that is in fluid communication with the high permeability zone 150, 152 from other portions of the production well 110 before injecting the dense $CO_2$ composition into the high permeability zone 150, 152. Isolating the portion of the production well 110 that is in fluid communication with the high permeability zone 150, 152 being treated may include installing one or more temporary plugs 140 in the production well 110. The temporary plugs 140 may be installed and disposed downhole of the portion of the production well 110 in fluid communication with the high permeability zone 150, 152 or both uphole and downhole of the portion of the production well 110 in fluid communication with the high permeability zone 150, 152 being treated. Referring to FIG. 6, in embodiments, the temporary plugs 140 may be disposed uphole and downhole of the high permeability zone 150 being treated to fluidly isolate the portion of the production well 110 that is in fluid communication with the high permeability zone 150 from uphole and downhole portions of the production well 110.

As previously discussed, each temporary plug 140 may be a composition or mechanical apparatus capable of fluidly isolating a portion of a wellbore for a specified duration and capable of being removed from the wellbore to restore fluid communication. Each of the temporary plugs 140 may be a mechanical plug, such as a packer or other mechanical device capable of sealing off the production well 110 at a particular downhole location, or a temporary gel plug, as previously described. Temporary gel plugs may be removed from the production well 110 by introducing chemicals to break up or dissolve the gel formed by the gelling polymer or by mechanically piercing or removing the temporary gel plug. Once the dense $CO_2$ composition 142 is injected into the high permeability zone 150, 152, the temporary plugs 140 may be removed from the production well 110.

The dense $CO_2$ composition 142 may be injected from the production well 110 into the high permeability zones 150, 152 by known methods. The dense $CO_2$ composition 142 may be injected from the production well 110 into each of the high permeability zones 150, 152 through a conduit 144 extending from the surface 102 of the production well 110 downhole to the portion of the production well 110 in fluid communication with the high permeability zone 150, 152 (the portion of the production well 110 isolated by the temporary plugs 140). The conduit 144 may include, but is not limited to, coiled tubing, wireline, a jointed pipe string, or other type of conduit. Injection of the dense $CO_2$ composition 142 into the high permeability zones 150, 152 does not fracture the high permeability zones 150, 152.

The dense $CO_2$ composition 142 may be injected at the temperature of the hydrocarbon bearing subterranean formation 100 at the high permeability zones 150, 152. In embodiments, the dense $CO_2$ composition 142 may be injected into the high permeability zones 150, 152 at a temperature of from 20° C. to 250° C., such as from 25° C. to 200° C., or from 25° C. to 150° C. The dense $CO_2$ composition 142 may be injected into the high permeability zones 150, 152 at a pressure greater than the critical pressure of $CO_2$, such as a pressure greater than or equal to 7.3773 megapascals. The dense $CO_2$ composition 142 may be injected into the high permeability zones 150, 152 at a pressure equal to the formation pressure of the hydrocarbon bearing subterranean formation 100. The dense $CO_2$ composition 142 may be injected into the high permeability zones 150, 152 at a pressure of from 1,000 psi (6.9 megapascals) to 3,000 psi (20.7 megapascals). The pressure at which the dense $CO_2$ composition 142 is injected into the high permeability zones 150, 152 may be less than a pressure that causes fracture of the formation.

Injection of the dense $CO_2$ composition 142 may be characterized by an injection duration, an injection volume, or both that are sufficient to adequately block the high permeability zones 150, 152 to reduce or prevent aqueous fluids 154 from flowing from the high permeability zones 150, 152 into the production well 110 during subsequent hydrocarbon production. The dense $CO_2$ composition 142 may be injected from the production well 110 into each high permeability zone 150, 152 for an injection duration of from 0.5 hours to 24 hours. The volume of dense $CO_2$ composition 142 injected into each high permeability zone 150, 152 may be sufficient to block the high permeability zone 150, 152 to reduce or prevent aqueous fluids from flowing from the high permeability zones 150, 152 into the production well 110. The volume of the dense $CO_2$ composition 142 injected into each high permeability zone 150, 152 may depend on the porosity of the high permeability zone 150, 152, which may be characterized by a total pore volume of the high permeability zone 150, 152. In embodiments, the volume of dense $CO_2$ composition injected into each of the high permeability zones 150, 152 may be from 0.1 to 1.0 or from 0.1 to 0.5 times the total pore volume (PV) of the high permeability zone being treated.

Injection of the dense $CO_2$ compositions 142 into the high permeability zones 150, 152 may displace fluids, such as aqueous formation fluids, aqueous treatment fluids, or other fluids, in the high permeability zone 150, 152. The dense $CO_2$ compositions 142 may also penetrate outward from the high permeability zone 150, 152 into the pores of the formation surrounding the high permeability zone 150, 152. The increased viscosity of the dense $CO_2$ compositions 142 provided by the thickener may be sufficient to prevent subsequent fluids flow in the formation from displacing the dense $CO_2$ compositions 142 from the high permeability zones 150, 152. Thus, the injection of the dense $CO_2$ composition 142 into the high permeability zones 130, 132 may reduce the permeability of the formation in the high permeability zones 150, 152. The reduced permeability caused by the dense $CO_2$ composition may reduce or prevent aqueous fluids from the high permeability zones 150, 152 into the production well 110 from the high permeability zones 150, 152. The injected dense $CO_2$ composition 142 may reduce the permeability of the formation in the high permeability zones 150, 152 by greater than or equal to 50%, greater than or equal to 70%, greater than or equal to 80%, greater than or equal to 90% or even greater than or equal to 95%. In embodiments, the hydrocarbon bearing subterranean formation 100 may be carbonate rock, and the injection of the dense $CO_2$ composition may reduce the permeability of carbonate rock by greater than or equal to 50%, greater than or equal to 70%, greater than or equal to 80%, greater than or equal to 90% or even greater than or equal to 95%. Injection of the dense $CO_2$ composition 142 having the increased viscosity does not fracture the formation in the high permeability zones 150, 152 or any other region in which the dense $CO_2$ composition 142 flows. The reduced permeability of the high permeability zones 150, 152 caused by injection of the dense $CO_2$ composition 142 may act as a barrier to reduce or prevent fluid flow into and through the high permeability zones 150, 152 and reduce or prevent aqueous fluids from flowing from the high permeability zones 150, 152 into the production well 110, thereby reducing water production from the production well 110.

Referring to FIGS. 6 and 7, each of the high permeability zones 150, 152 may be treated with the dense $CO_2$ composition 142 sequentially. Referring to FIG. 6, the hydrocarbon bearing subterranean formation 100 may include a first high permeability zone 150 and a second high permeability zone 152. The first high permeability zone 150 may be fluidly isolated from the rest of the production well 110 by installing the temporary plugs 140 uphole and downhole of the first high permeability zone 150, as previously described. The dense $CO_2$ composition 142 may then be injected into the first high permeability zone 150 to treat the first high permeability zone 150. In embodiments, the temporary plugs 140 isolating the first high permeability zone 150 may be removed from the production well 110 after injection of the dense $CO_2$ composition 142. In embodiments, such as when the first high permeability zone 150 is downhole of the second high permeability zone 152, the temporary plugs 140 isolating the first high permeability zone 150 may be left in the production well 110 until after treating the second high permeability zone 152.

Referring now to FIG. 7, after treating the first high permeability zone 150, the second high permeability zone 152 may be treated with the dense $CO_2$ composition 142. The portion of the production well 110 in fluid communication with the second high permeability zone 152 may be fluidly isolated from the rest of the production well 110 by installing the temporary plugs 140 uphole and downhole of the second high permeability zone 152. Once the second high permeability zone 152 is isolated, the dense $CO_2$ compositions 142 may be injected into the second high permeability zone 152 to block the second high permeability zone 152. The temporary plugs 140 isolating the second high permeability zone 152 may then be removed following injection of the dense $CO_2$ composition 142. The process of isolation, injection, and de-isolation may be repeated for additional high permeability zones in fluid communication with the production well 110 until all the high permeability zones 150, 152 have been treated or injected with the dense $CO_2$ compositions.

Figure 14:
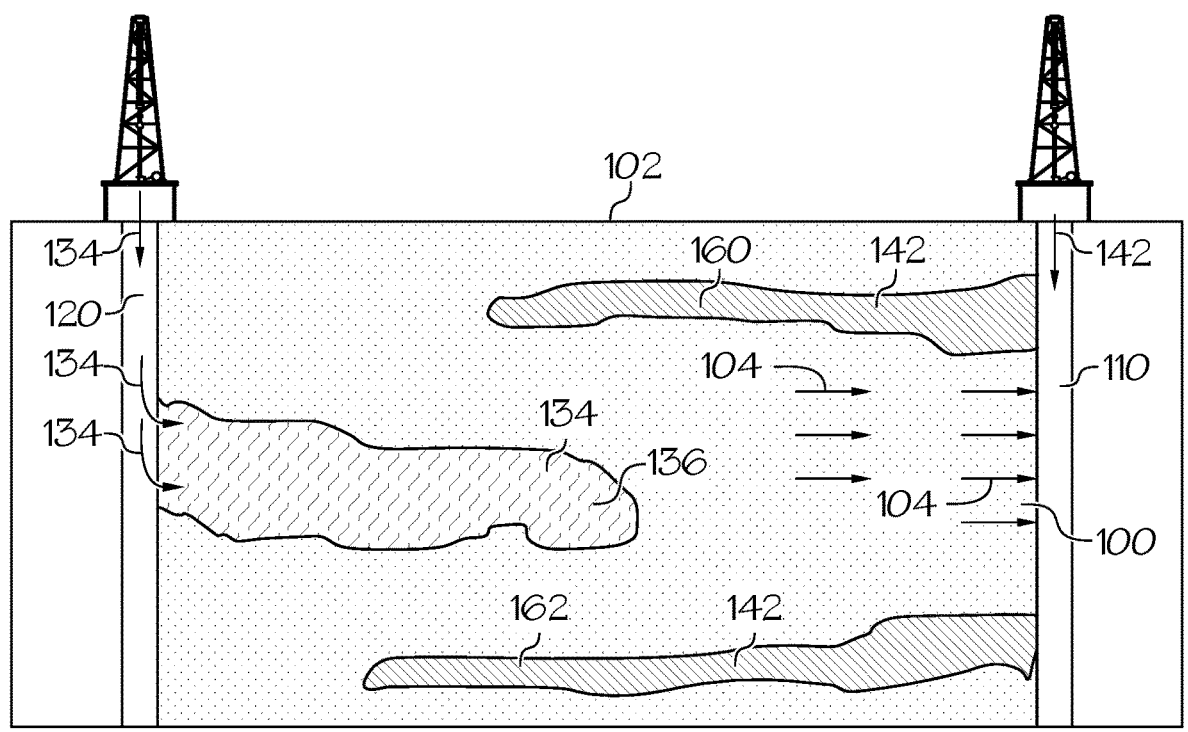
FIG. 14 schematically depicts injection of an aqueous treatment fluid from an injection well into a hydrocarbon bearing subterranean formation in combination with injection of a dense $CO_2$ composition from a production well, according to one or more embodiments shown and described in the present disclosure.

Referring again to FIG. 8, the methods of the present disclosure for reducing water production from the hydrocarbon bearing subterranean formation 100 may include withdrawing the hydrocarbons 104 from the production well 110. The dense $CO_2$ compositions 142 injected into the high permeability zones 150, 152 may reduce the permeability of the high permeability zones 150, 152, which may provide a barrier that blocks the high permeability zones 150, 152 to reduce or prevent the flow of aqueous fluids, such as but not limited to connate water, aqueous treatment fluids, or other aqueous fluids, through the high permeability zones 150, 152 to the production well 110. This reduces the volume of water produced at the production well 110. Thus, the fluids produced by the production well 110 may include a greater proportion of hydrocarbons 104 from the hydrocarbon bearing subterranean formation 100 compared to the fluids produced before treatment of the high permeability zones 150, 152. Referring now to FIG. 14, after injecting a dense $CO_2$ composition 142 into the production well 110 and into high permeability zones 160, 162, the method may include injecting an aqueous treatment fluid 134 from an injection well 120 into the hydrocarbon bearing subterranean formation 100. The injection well 120 can be spaced apart from the production well 110. The injecting of the aqueous treatment fluid 134 into the hydrocarbon bearing subterranean formation 100 may drive hydrocarbons 104 in the hydrocarbon bearing subterranean formation 100 to the production well 110.

The methods of the present disclosure for reducing water production from hydrocarbon bearing subterranean formations may further include preparing the dense $CO_2$ composition 142. Preparing the dense $CO_2$ composition 142 may include providing dense $CO_2$, combining the thickener with the dense $CO_2$, and mixing the dense $CO_2$ and thickener for a period of time sufficient to completely dissolve the thickener in the dense $CO_2$ to produce the dense $CO_2$ composition, as previously discussed in the present disclosure. In embodiments, the dense $CO_2$ composition may be prepared at the surface 102 immediately prior to injection into the injection well 120.

EXAMPLES

The various embodiments of the dense carbon dioxide compositions and methods employing the dense carbon dioxide compositions to enhance oil recovery from hydrocarbon bearing subterranean formations according to the present disclosure will be further clarified by the following examples. The examples are illustrative in nature, and should not be understood to limit the subject matter of the present disclosure.

Examples 1 and 2: Solubility of Thickener in Dense Carbon Dioxide

In Examples 1 and 2, the objective is to assess solubility of the thickener in different phases of $CO_2$ and to investigate the compatibility of the thickener with $CO_2$ at different conditions. The solubility tests of Examples 1 and 2 provide an indication of the stability of the thickener with the $CO_2$ over time. In all of the examples of the present disclosure, the thickener used was Dry-Fracturing Fluid Friction Reducer and Thickener: APFR-2 manufactured by Beijing AP Polymer Technology Co., LTD located in Beijing, China. The solubility of the thickener was evaluated by combining the thickener with $CO_2$ at a pressure of 1500 psi (10,342 kPa) in Example 1 and a pressure of 2500 psi (17,237 kPa) for Example 2. For each of Examples 1 and 2, a known volume of the thickener equal to 2 volume percent of the final composition was charged into a high pressure/high temperature (HPTP) cell under vacuum and at ambient temperature. $CO_2$ was then injected into the HPHT cell at 1500 psi in Example 1 and at 2500 psi in Example 2. The HPHT cell was equipped with a stirrer so that mixing could be instigated at the experimental conditions.

For Example 1, the solubility test was conducted at 1500 psi and 25° C. According to the $CO_2$ phase diagram, $CO_2$ is in the supercritical phase at these conditions. In Example 1, the thickener was observed to be soluble in the dense supercritical $CO_2$ and a single phase of both fluids formed. For Example 2, the solubility test was conducted at 2500 psi and 25° C. At these conditions, $CO_2$ is in the supercritical phase. In Example 2, the thickener was observed to be soluble in the dense supercritical $CO_2$ and a single phase of the supercritical $CO_2$ and the thickener formed. Examples 1 and 2 show that the thickener is soluble in supercritical dense $CO_2$. In particular, Examples 1 and 2 demonstrate that the thickener is able to dissolve in supercritical dense $CO_2$ at conditions (pressure) very similar to oilfield conditions, such as the pressures encountered in hydrocarbon bearing subterranean formations.

Comparative Examples 3 and 4: Viscosity of Dense Carbon Dioxide

Figure 9:
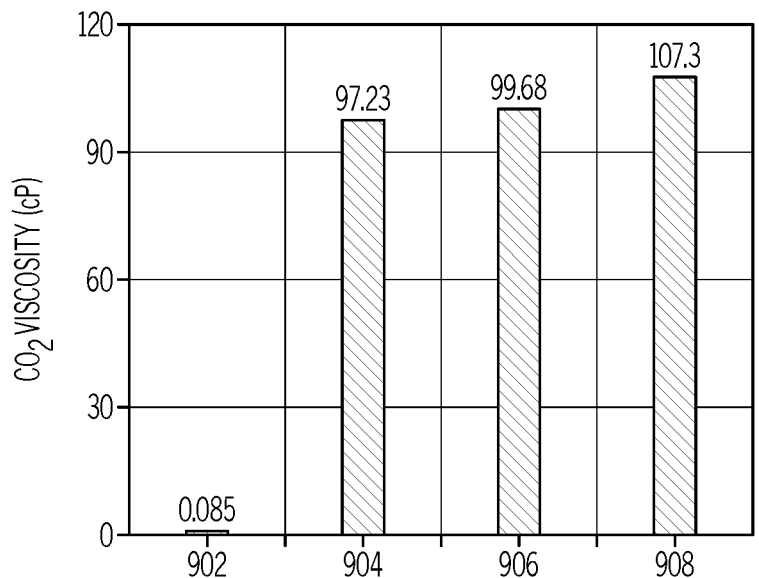
FIG. 9 graphically depicts a viscosity of a dense $CO_2$ composition (y-axis) for dense $CO_2$ compositions having different concentrations of a thickener in the dense $CO_2$ composition (x-axis) at a pressure of 2000 pounds per square inch (psi) (13,790 kPa), according to one or more embodiments shown and described in the present disclosure.
Figure 10:
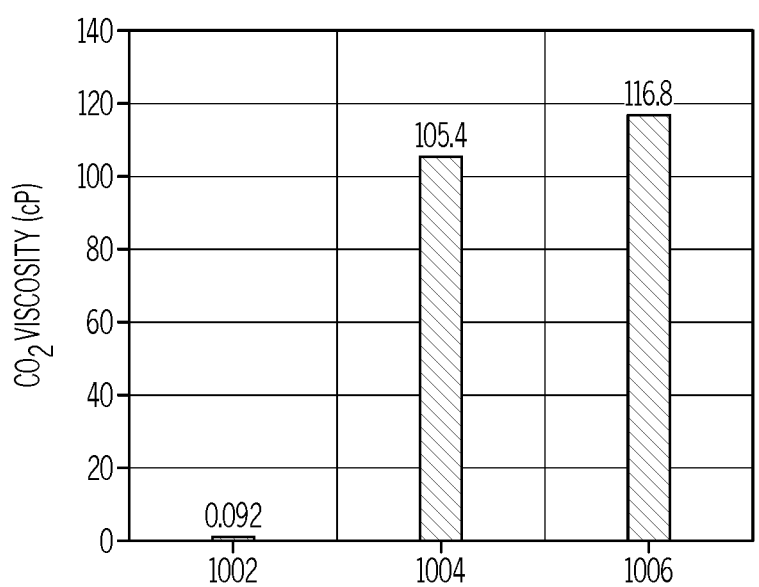
FIG. 10 graphically depicts a viscosity of a dense $CO_2$ composition (y-axis) for dense $CO_2$ compositions having different concentration of a thickener in the dense $CO_2$ composition (x-axis) at a pressure of 2500 psi (17,237 kPa), according to one or more embodiments shown and described in the present disclosure.

For Comparative Examples 3 and 4, the viscosity of dense $CO_2$ was determined without the thickener at pressures of 2000 psi (13,790 kPa) and 2500 psi (17,237 kPa), respectively. A Cambridge viscometer apparatus was used to conduct the viscosity measurements. The pressure and viscosity measurements for Comparative Examples 3 and 4 are provided in Table 1 and graphically depicted in FIGS. 9 and 10. Comparative Example 3 is indicated in FIG. 9 by reference number 902 and Comparative Example 4 is indicated in FIG. 10 by reference number 1002.

Examples 5-9: Viscosity of Dense Carbon Dioxide Compositions Comprising the Thickener For Examples 5-9, the viscosity of the dense $CO_2$ compositions were evaluated at different concentrations of the thickener in the dense $CO_2$ compositions and at different conditions. The Cambridge viscometer apparatus discussed in Comparative Examples 3 and 4 was used to conduct the viscosity measurements at different pressures. The concentrations of the thickener, pressure, and measured viscosities for each of Examples 5-9 are provided in Table 1 and are graphically depicted in FIGS. 9 and 10. The viscosities in Table 1 are provided in units of centipoise (cP).

TABLE 1

Viscosity Data Comparative Examples 3 and 4 and Examples 5-9

| Example | FIG. Reference Number | Concentration of Thickener (wt. %) | Pressure (psi/kPa) | Viscosity (cP) |
|---|---|---|---|---|
| Comparative Example 3 | 902 | 0.00 | 2000/13,790 | 0.085 |
| Example 5 | 904 | 0.50 | 2000/13,790 | 97.23 |
| Example 6 | 906 | 1.00 | 2000/13,790 | 99.68 |
| Example 7 | 908 | 2.00 | 2000/13,790 | 107.3 |
| Comparative Example 4 | 1002 | 0.00 | 2500/17,237 | 0.092 |
| Example 8 | 1004 | 1.00 | 2500/17,237 | 105.4 |
| Example 9 | 1006 | 1.75 | 2500/17,237 | 116.8 |

The results reported in Table 1 and FIGS. 9 and 10 show that the addition of the thickener to the dense $CO_2$ enhances the viscosity of the dense $CO_2$ significantly. The increase in the viscosity of the $CO_2$ resulting from adding the thickener (Examples 5-9) is in the range between 1100 and 1250 times the viscosity of the dense $CO_2$ without the thickener (Comparative Examples 3 and 4). The increase in viscosity is accomplished at pressures typical of conditions in oilfields, such as the pressures encountered in hydrocarbon-bearing subterranean formations.

Example 10: Coreflood Experiments

In Example 10, dense $CO_2$ compositions comprising the dense $CO_2$ and thickener were evaluated for use in enhanced oil recovery processes by conducting coreflood studies. The core samples used in the coreflood experiments were Indiana limestone (carbonate rock) cores having an initial permeability of 58.9 millidarcies (mD). The properties of the core sample is provided below in Table 2.

TABLE 2

Properties of Core Samples and
Coreflood Conditions for Example 10

| Property | Units | Value |
| --- | --- | --- |
| Type of Rock | N/A | Indiana Limestone |
| Core Sample Length | inches/centimeters | 4.0/10.16 |
| Core Sample Diameter | inches/centimeters | 1.5/3.81 |
| Initial Porosity | percent | 18 |
| Initial Permeability | millidarcies (mD) | 58.9 |
| Injection Rate | milliliters/min | 5 |
| Confining Pressure | psi/kPa | 2,000/13,790 |

Figure 11:
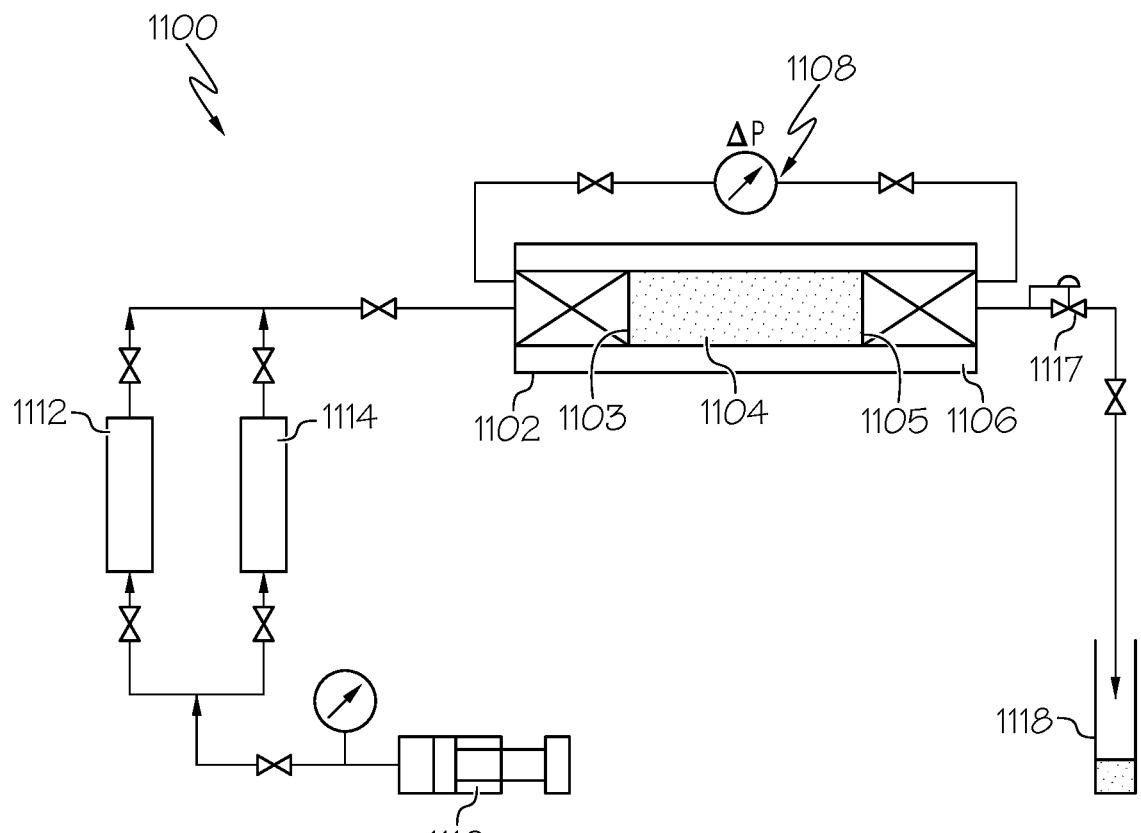
FIG. 11 schematically depicts an experimental setup for conducting coreflood experiments on core samples, according to one or more embodiments shown and described in the present disclosure.

Referring now to FIG. 11, the coreflood experimental system 1100 for conducting the coreflood experiments of Example 10 is schematically depicted. The coreflood experimental system 1100 used was a Model RPS-855-Z coreflood system specifically designed for injection of dense $CO_2$ and manufactured by Coretest Systems, Inc. of Reno, Nev. The coreflood experimental system 1100 includes a core holder 1102 operable to hold the core sample 1104 and direct a fluid to pass longitudinally through the core sample 1104 from the upstream end 1103 to the downstream end 1105. The core holder 1102 may include a confining fluid 1106 that may be operable to maintain the core sample 1104 at a simulated downhole operating pressure and to prevent the fluids directed into the core sample 1104 from passing radially outward out of the core sample 1104. The core holder 1102 may include a pressure regulation system 1108 operable to regulate the pressure of the core sample 1104. The coreflood experimental system 1100 may also include a high-pressure pump 1110, a water accumulator 1112, a dense $CO_2$ composition accumulator 1114, and a fraction collector 1118 as depicted in FIG. 11. The coreflood experimental system 1100 may also include a back pressure regulator 1117 downstream of the core holder 1102 and upstream of the fraction collector 1118 to control back pressure in the system.

For Example 10, each core sample was placed in the core holder and flooded with water under a confining pressure of 2,000 psi (13,790 kPa) and an injection flow rate of 5 milliliters per minute. The confined pressure is the pressure under which the core plug sample is confined. A volume of water equivalent to 2 times the total pore volume of the core sample was injected. Following the initial water injection, one equivalent pore volume of the dense $CO_2$ composition was injected into the core sample under the same confining pressure. The dense $CO_2$ composition included a mixture of 2 volume percent thickener and 98 volume percent supercritical $CO_2$. Following injection of the dense $CO_2$ composition, a second stage of water equal to 3 times the total initial pore volume of the core sample was injected into the core sample at the same confining pressure. The confining pressure of 2000 psi and injection flowrate of 5 ml/min were the same for all three injection stages (water 1/dense $CO_2$ composition/water 2). The pressure drop across the core sample was measured as a function of injection volume for the first water injection stage, the dense $CO_2$ composition injection, and the second water injection stage. The results are provided graphically in FIG. 12. The first water injection stage is indicated by reference number 1202 in FIG. 12, the dense $CO_2$ composition injection stage is indicated by reference number 1204 in FIG. 12, and the second water injection stage is indicated by reference number 1206 in FIG. 12.

Figure 12:
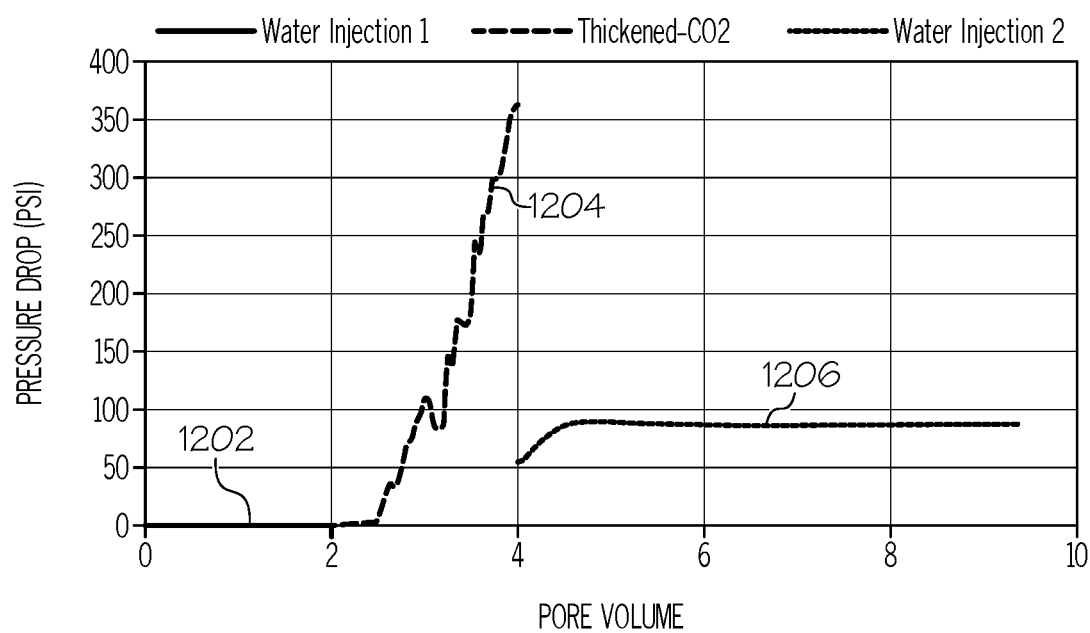
FIG. 12 graphically depicts pressure drop across a core sample (y-axis) as a function of volume of fluid injected into the core sample (x-axis) for carbonate rock core samples injected with water followed by a dense $CO_2$ composition and then followed by a second stage of water using the coreflood experimental setup of FIG. 11, according to one or more embodiments shown and described in the present disclosure.

Referring to FIG. 12, the pressure drop across the core sample increased by over 350 psi (2417 kPa) during injection of the dense $CO_2$ composition (1204). Following injection of the dense $CO_2$ composition, the pressure drop of the subsequent second water flood stage (1206) was at least 80 psi (552 kPa) greater than the pressure drop during the first water flood stage (1202), indicating that the dense $CO_2$ composition greatly reduced the permeability of the core sample. The water permeability of the core sample was measured before and after the injection of dense $CO_2$ composition. The injection of the dense $CO_2$ composition comprising the thickener into the limestone rock core sample significantly reduced the permeability of the core sample from 58.9 mD to 1.3 mD. This is about 45 times reduction in the permeability of the rock provided by injecting the dense $CO_2$ composition.

Comparative Example 11

In Comparative Example 11, a core sample was subjected to coreflooding using dense $CO_2$ without thickener, for comparison purposes. The coreflood experiment of Comparative Example 11 was conducted using the coreflood experimental setup 1100 previously described in Example 10. The core samples used in the coreflood experiment of Comparative Example 11 were Indiana limestone (carbonate rock) cores having an initial permeability of 58.9 millidarcies (mD). The properties of the core sample were provided previously in Table 2. For Comparative Example 11, the core sample was placed in the core holder and flooded with unthickened dense $CO_2$ (without the thickener) under a confining pressure of 2,000 psi (13,790 kPa) and an injection flow rate of 5 milliliters per minute.

Figure 13:
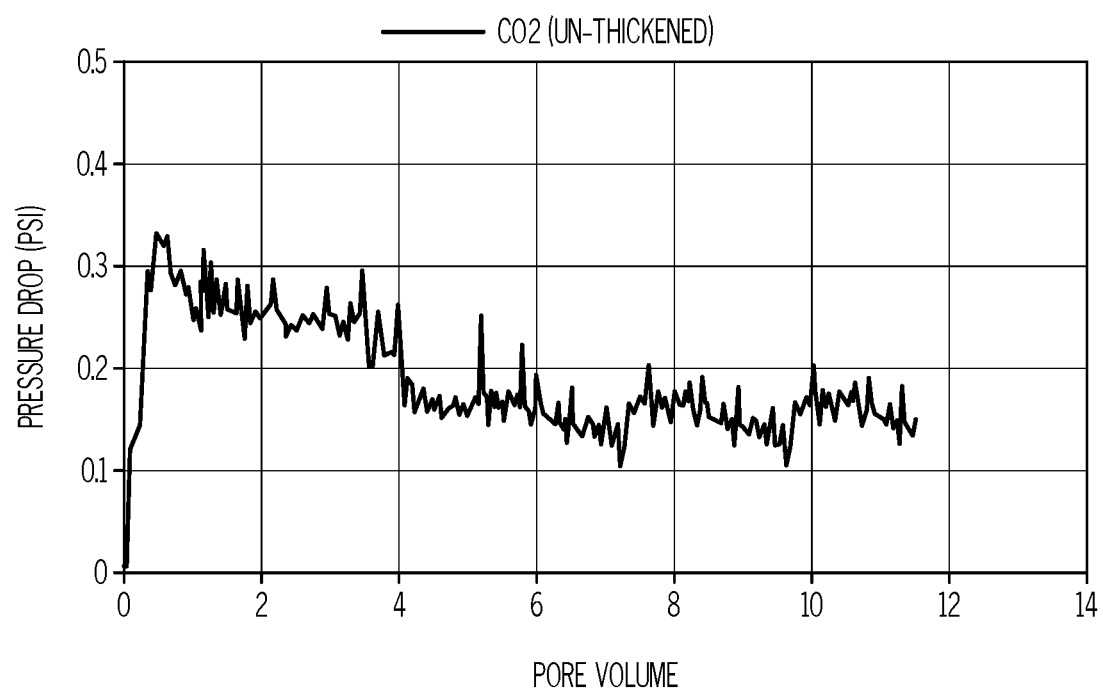
FIG. 13 graphically depicts pressure drop across a core sample (y-axis) as a function of volume of fluid injected into the core sample (x-axis) for carbonate rock core samples injected with non-thickened dense $CO_2$ that does not include the thickener.

Referring now to FIG. 13, the pressure drop across the core sample as a function of the volume of unthickened dense $CO_2$ of Comparative Example 11 is graphically depicted. The average pressure drop across the core sample for Comparative Example 11 was 0.15 psi, which was less than the average pressure drop across the core sample of 1.85 psi for the first water stage injection of Example 10. Water has a greater viscosity than unthickened dense $CO_2$ (without thickener). Thus, without the thickener, the dense $CO_2$ is less effective than water at blocking the pores of the formation, as shown by the reduced pressure drop across the core sample for Comparative Example 11 compared to the pressure drop across the core sample during the first water injection stage in Example 10. Referring to FIG. 12, addition of the thickener to the dense $CO_2$ to form the dense $CO_2$ composition greatly increases the viscosity and, thus, greatly increases the blocking effectiveness of the dense $CO_2$ composition of Example 10 compared to the unthickened dense $CO_2$ of Comparative Example 11.

In a first aspect of the present disclosure, a method for reducing water production from a hydrocarbon bearing subterranean formation may include identifying a high permeability zone in the hydrocarbon bearing subterranean formation and injecting a dense carbon dioxide composition from a production well into the high permeability zone. The dense carbon dioxide composition comprises dense carbon dioxide and a thickener soluble in the dense carbon dioxide, where the thickener comprises a copolymer. The copolymer may be the polymerized reaction product of monomers that include at least one alkenyl ether or dialkenyl ether monomer, at least one acrylate or methacrylate monomer, at least one structural monomer, and at least one allyl ester monomer. The method may further include, after injecting the dense carbon dioxide composition into the high permeability zone, withdrawing hydrocarbons from the hydrocarbon bearing subterranean formation through the production well.

The dense carbon dioxide composition may block pores in the high permeability zone to reduce or prevent flow of water from the high permeability zone into the production well.

A second aspect of the present disclosure may include the first aspect, where the dense carbon dioxide may be supercritical carbon dioxide.

A third aspect of the present disclosure may include either one of the first of second aspects, where the dense carbon dioxide composition may comprise from 0.05 weight percent to 3.0 weight percent thickener based on the total weight of the dense carbon dioxide composition, such as from 0.1 wt. % to 1 wt. %, from 0.1 wt. % to 0.5 wt. %, or from 0.1 wt. % to 0.3 wt. % thickener based on the total weight of the dense carbon dioxide composition.

A fourth aspect of the present disclosure may include any one of the first through third aspects, where the thickener may further comprise at least one co-solvent that includes one or more of propylene carbonate, allyl ethyl carbonate, dimethyl carbonate, white oil, silicon oil, petroleum ether, or combinations of these.

A fifth aspect of the present disclosure may include the fourth aspect, where the co-solvent may comprise at least one carbon dioxide compatible solvent selected from propylene carbonate, dimethyl carbonate, or combinations of these and at least one oil-dissolving solvent selected from white oil, silicon oil, petroleum ether, or combinations of these.

A sixth aspect of the present disclosure may include the fifth aspect, where the thickener may comprise from 45 weight percent to 65 weight percent carbon dioxide compatible solvent and from 10 weight percent to 15 weight percent oil dissolving solvent based on the total weight of the thickener.

A seventh aspect of the present disclosure may include any one of the first through sixth aspects, where the copolymer may be a linear block copolymer.

An eighth aspect of the present disclosure may include any one of the first through seventh aspects, where the at least one structural monomer may comprise an acrylic acid long carbon chain ester, a methacrylic acid long carbon chain ester, styrene, methyl styrene, benzene, propyl benzene, or combinations of these.

A ninth aspect of the present disclosure may include any one of the first through eighth aspects, where the at least one alkenyl ether or dialkenyl ether monomer may comprise one or more of divinyl ether, ethyl propylene ether, n-propyl vinyl ether, or combinations of these.

A tenth aspect of the present disclosure may include any one of the first through ninth aspects, where the at least one acrylate or methacrylate monomer may comprise one or more of methyl acrylate, ethyl acrylate, butyl acrylate, methyl methacrylate, ethyl methacrylate, butyl methacrylate, or combinations of these.

An eleventh aspect of the present disclosure may include any one of the first through tenth aspects, where the thickener may comprise from 3 weight percent to 5 weight percent structural monomer, from 5 weight percent to 10 weight percent alkenyl ether or dialkenyl ether monomer, from 15 weight percent to 20 weight percent acrylate or methacrylate monomer, and from 1 weight percent to 3 weight percent allyl ester monomer, where the weight percentages are based on the total weight of the thickener.

A twelfth aspect of the present disclosure may include any one of the first through eleventh aspects, where the copolymer of the thickener may have an average molecular weight of from 500,000 grams per mole to 800,000 grams per mole.

A thirteenth aspect of the present disclosure may include any one of the first through twelfth aspects, where the thickener may have a pH of from 5.0 to 8.0.

A fourteenth aspect of the present disclosure may include any one of the first through thirteenth aspects, where the thickener may have a specific gravity of from 0.90 to 1.10.

A fifteenth aspect of the present disclosure may include any one of the first through fourteenth aspects, where 1 percent by weight of the thickener may dissolve in supercritical carbon dioxide in less than or equal to 3 minutes at 25 degrees Celsius.

A sixteenth aspect of the present disclosure may include any one of the first through fifteenth aspects, where the thickener may increase the viscosity of the dense carbon dioxide by at least 100 times the viscosity of the dense carbon dioxide without the thickener.

A seventeenth aspect of the present disclosure may include any one of the first through sixteenth aspects, where the dense carbon dioxide composition may have a viscosity of from 50 millipascal seconds to 150 millipascal seconds.

An eighteenth aspect of the present disclosure may include any one of the first through seventeenth aspects, where the dense carbon dioxide composition may reduce the permeability of carbonate rock by greater than or equal to 50%.

A nineteenth aspect of the present disclosure may include any one of the first through eighteenth aspects, where the dense carbon dioxide composition may be injected at a pressure of from 900 pounds per square inch to 3,000 pounds per square inch.

A twentieth aspect of the present disclosure may include any one of the first through nineteenth aspects, where the dense carbon dioxide composition may be injected at a temperature of from 20° C. to 150° C.

A twenty-first aspect of the present disclosure may include any one of the first through twentieth aspects, where injecting the dense carbon dioxide composition may comprise isolating a portion of the production well in fluid communication with the high permeability zone from other portions of the production well before injecting the dense carbon dioxide composition into the high permeability zone.

A twenty-second aspect of the present disclosure may include the twenty-first aspect, where isolating the portion of the production well in fluid communication with the high permeability zone from other portions of the production well may comprise installing one or more temporary plugs in the production well.

A twenty-third aspect of the present disclosure may include the twenty-second aspect, where the one or more temporary plugs may be disposed in the production well downhole of the high permeability zone or both uphole and downhole of the high permeability zone.

A twenty-fourth aspect of the present disclosure may include either one of the twenty-second or twenty-third aspects, where the one or more temporary plugs may comprise gel plugs.

A twenty-fifth aspect of the present disclosure may include any one of the twenty-first through twenty-fourth aspects, further comprising, after injecting the dense carbon dioxide composition, removing isolation of the portion of the production well in fluid communication with the high permeability zone.

A twenty-sixth aspect of the present disclosure may include any one of the first through twenty-fifth aspects, comprising resuming production of hydrocarbons from the production well.

A twenty-seventh aspect of the present disclosure may include any one of the first through twenty-sixth aspects, comprising injecting an aqueous treatment fluid from an injection into the hydrocarbon bearing subterranean formation, where the injection well may be spaced apart from the production well and the injecting of the aqueous treatment fluid may drive hydrocarbons in the hydrocarbon bearing subterranean formation to the production well.

It is noted that one or more of the following claims utilize the terms "where," "wherein," or "in which" as transitional phrases. For the purposes of defining the present technology, it is noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

The invention claimed is:

1. A method for reducing water production from a hydrocarbon bearing subterranean formation, the method comprising:
   identifying a high permeability zone in the hydrocarbon bearing subterranean formation;
   injecting a dense carbon dioxide composition from a production well into the high permeability zone, wherein the dense carbon dioxide composition comprises dense carbon dioxide and a thickener soluble in the dense carbon dioxide, the thickener comprises a copolymer, the copolymer being a polymerized reaction product of monomers that include:
      at least one alkenyl ether or dialkenyl ether monomer;
      at least one acrylate or methacrylate monomer;
      at least one structural monomer; and
      at least one allyl ester monomer; and
   after injecting the dense carbon dioxide composition into the high permeability zone, withdrawing hydrocarbons from the hydrocarbon bearing subterranean formation through the production well,
   wherein the dense carbon dioxide composition blocks pores in the high permeability zone to reduce or prevent flow of water from the high permeability zone into the production well.

2. The method of claim 1, where the dense carbon dioxide is supercritical carbon dioxide.

3. The method of claim 1, where the dense carbon dioxide composition comprises from 0.05 weight percent to 3.0 weight percent thickener based on a total weight of the dense carbon dioxide composition.

4. The method of claim 1, where the copolymer of the thickener comprises an average molecular weight of from 500,000 grams per mole to 800,000 grams per mole.

5. The method of claim 1, where the thickener has a pH of from 5.0 to 8.0.

6. The method of claim 1, where the thickener has a specific gravity of from 0.90 to 1.10.

7. The method of claim 1, where 1 percent by weight of the thickener dissolves in supercritical carbon dioxide in less than or equal to 3 minutes at 25 degrees Celsius.

8. The method of claim 1, where the thickener increases a viscosity of the dense carbon dioxide by at least 100 times a viscosity of the dense carbon dioxide without the thickener.

9. The method of claim 1, where the dense carbon dioxide composition has a viscosity of from 50 millipascal seconds to 150 millipascal seconds.

10. The method of claim 1, where the dense carbon dioxide composition reduces a permeability of a carbonate rock by greater than or equal to 50%.

11. The method of claim 1, where the dense carbon dioxide composition is injected at a pressure of from 900 pounds per square inch to 3,000 pounds per square inch.

12. The method of claim 1, where the dense carbon dioxide composition is injected at a temperature of from 20° C. to 150° C.

13. The method of claim 1, where injecting the dense carbon dioxide composition comprises isolating a portion of the production well in fluid communication with the high permeability zone from other portions of the production well before injecting the dense carbon dioxide composition into the high permeability zone.

14. The method of claim 13, where isolating the portion of the production well in fluid communication with the high permeability zone from other portions of the production well comprises installing one or more temporary plugs in the production well.

15. The method of claim 14, where the one or more temporary plugs are disposed in the production well downhole of the high permeability zone or both uphole and downhole of the high permeability zone.

16. The method of claim 14, where the one or more temporary plugs comprise gel plugs.

17. The method of claim 13, where, after injecting the dense carbon dioxide composition, removing isolation of the portion of the production well in fluid communication with the high permeability zone.

18. The method of claim 1, comprising resuming production of hydrocarbons from the production well.

19. The method of claim 1, comprising injecting an aqueous treatment fluid from an injection well into the hydrocarbon bearing subterranean formation, wherein:
   the injection well is spaced apart from the production well; and
   the injecting of the aqueous treatment fluid drives hydrocarbons in the hydrocarbon bearing subterranean formation to the production well.

20. A method for reducing water production from a hydrocarbon bearing subterranean formation, the method comprising:
   identifying a high permeability zone in the hydrocarbon bearing subterranean formation;

injecting a dense carbon dioxide composition from a production well into the high permeability zone, wherein the dense carbon dioxide composition comprises dense carbon dioxide and a thickener soluble in the dense carbon dioxide, the thickener comprises a copolymer, the copolymer being a polymerized reaction product of monomers that include:
  at least one alkenyl ether or dialkenyl ether monomer;
  at least one acrylate or methacrylate monomer;
  at least one structural monomer; and
  at least one allyl ester monomer; and
  where the co-solvent includes one or more of propylene carbonate, allyl ethyl carbonate, dimethyl carbonate, white oil, silicon oil, petroleum ether, or combinations of these; and
after injecting the dense carbon dioxide composition into the high permeability zone, withdrawing hydrocarbons from the hydrocarbon bearing subterranean formation through the production well,
wherein the dense carbon dioxide composition blocks pores in the high permeability zone to reduce or prevent flow of water from the high permeability zone into the production well.

* * * * *